(12) United States Patent (10) Patent No.: US 8,793,165 B1
Mussman et al. (45) Date of Patent: *Jul. 29, 2014

(54) METHOD, PROGRAM STORAGE DEVICE, AND APPARATUS FOR OFFERING A USER A PLURALITY OF SCENARIOS UNDER WHICH TO CONDUCT A PRIMARY TRANSACTION

(75) Inventors: David C. Mussman, Omaha, NE (US); Thomas B. Barker, Omaha, NE (US); Gary L. West, Omaha, NE (US); Ronald A. Katz, Los Angeles, CA (US)

(73) Assignee: Tuxis Technologies LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/308,651

(22) Filed: Dec. 1, 2011

Related U.S. Application Data

(63) Continuation of application No. 12/942,426, filed on Nov. 9, 2010, now Pat. No. 8,086,503, which is a continuation of application No. 12/194,189, filed on Aug. 19, 2008, now Pat. No. 7,853,488, which is a continuation of application No. 10/335,061, filed on Dec. 31, 2002, now Pat. No. 7,437,313, which is a continuation-in-part of application No. 09/505,619, filed on Feb. 16, 2000, now Pat. No. 7,280,979, which is a continuation of application No. 09/038,399, filed on Mar. 11, 1998, now Pat. No. 6,055,513.

(51) Int. Cl.
*G06Q 30/00* (2006.01)
(52) U.S. Cl.
USPC ..... 705/26.7; 705/26.1; 705/14.4; 705/14.49; 705/14.51
(58) Field of Classification Search
USPC .............................. 705/14.4–14.73, 26.1–27.2
See application file for complete search history.

(56) References Cited

U.S. PATENT DOCUMENTS 4,195,864 A 4/1980 Morton et al.
4,706,121 A 11/1987 Young
(Continued)

FOREIGN PATENT DOCUMENTS

CA 2222229 A1 7/1998
EP 0265083 A1 4/1988
(Continued)

OTHER PUBLICATIONS

"1-800-Future: What to do when tomorrow's consumer's call?". Otto, CHarlotte. Vital Speeches of the Day. New York. Jun. 15, 1997. vol. 63, Iss. 17. pp. 523, 6 pages.

(Continued)

*Primary Examiner* — William Allen
(74) *Attorney, Agent, or Firm* — Lerner, David, Littenberg, Krumholz & Mentlik, LLP

(57) ABSTRACT

A method of offering a user a plurality of scenarios under which to conduct at least one primary transaction involving at least one specific item, the specific item being one of goods and services, with each one of these scenarios entailing a corresponding cost to the user. The method can include at least the following. Communication is established via a communications device between the user and a system to facilitate the primary transaction. Primary transaction data is obtained relating to the primary transaction, with the primary transaction data including data representing an identity of the user and representing the at least one specific item. The user is offered a choice between at least two scenarios under which to conduct the primary transaction, determining costs of the transaction based on allowance of receiving offers of upsell transactions.

26 Claims, 15 Drawing Sheets

(56) References Cited

U.S. PATENT DOCUMENTS

| | | |
|---|---|---|
| 4,758,823 A | 7/1988 | Berruyer et al. |
| 4,792,968 A | 12/1988 | Katz |
| 4,799,156 A | 1/1989 | Shavit et al. |
| 4,812,628 A | 3/1989 | Boston et al. |
| 4,825,045 A | 4/1989 | Humble |
| 4,833,308 A | 5/1989 | Humble |
| 4,845,658 A | 7/1989 | Gifford |
| 4,845,739 A | 7/1989 | Katz |
| 4,870,579 A | 9/1989 | Hey |
| 4,908,761 A | 3/1990 | Tai |
| 4,910,672 A | 3/1990 | Off et al. |
| 4,947,028 A | 8/1990 | Gorog |
| 4,967,366 A | 10/1990 | Kaehler |
| 4,992,940 A | 2/1991 | Dworkin |
| 4,996,642 A | 2/1991 | Hey |
| 5,010,485 A | 4/1991 | Bigari |
| 5,053,957 A | 10/1991 | Suzuki |
| 5,056,019 A | 10/1991 | Schultz et al. |
| 5,173,851 A | 12/1992 | Off et al. |
| 5,201,010 A | 4/1993 | Deaton et al. |
| 5,209,665 A | 5/1993 | Billings et al. |
| 5,231,571 A | 7/1993 | D'Agostino |
| 5,235,509 A | 8/1993 | Mueller et al. |
| 5,237,620 A | 8/1993 | Deaton et al. |
| 5,270,920 A | 12/1993 | Pearse et al. |
| 5,293,615 A | 3/1994 | Amada |
| 5,295,064 A | 3/1994 | Malec et al. |
| 5,305,196 A | 4/1994 | Deaton et al. |
| 5,319,542 A | 6/1994 | King, Jr. et al. |
| 5,327,508 A | 7/1994 | Deaton et al. |
| 5,353,218 A | 10/1994 | De Lapa et al. |
| 5,353,219 A | 10/1994 | Mueller et al. |
| 5,369,571 A | 11/1994 | Metts |
| 5,388,165 A | 2/1995 | Deaton et al. |
| 5,398,186 A | 3/1995 | Nakhla |
| 5,412,708 A | 5/1995 | Katz |
| 5,430,644 A | 7/1995 | Deaton et al. |
| 5,442,771 A | 8/1995 | Filepp et al. |
| 5,446,891 A | 8/1995 | Kaplan et al. |
| 5,448,471 A | 9/1995 | Deaton et al. |
| 5,459,306 A | 10/1995 | Stein et al. |
| 5,481,094 A | 1/1996 | Suda |
| 5,481,294 A | 1/1996 | Thomas et al. |
| 5,483,278 A | 1/1996 | Strubbe et al. |
| 5,490,060 A | 2/1996 | Malec et al. |
| 5,495,284 A | 2/1996 | Katz |
| 5,500,681 A | 3/1996 | Jones |
| 5,502,368 A | 3/1996 | Syverson et al. |
| 5,502,636 A | 3/1996 | Clarke |
| 5,504,675 A | 4/1996 | Cragun et al. |
| 5,515,130 A | 5/1996 | Tsukahara et al. |
| 5,532,735 A | 7/1996 | Blahut et al. |
| 5,535,130 A | 7/1996 | Long |
| 5,537,590 A | 7/1996 | Amado |
| 5,566,353 A | 10/1996 | Cho et al. |
| 5,576,951 A | 11/1996 | Lockwood |
| 5,583,763 A | 12/1996 | Atcheson et al. |
| 5,592,378 A | 1/1997 | Cameron et al. |
| 5,592,560 A | 1/1997 | Deaton et al. |
| 5,612,868 A | 3/1997 | Off et al. |
| 5,615,342 A | 3/1997 | Johnson |
| 5,615,408 A | 3/1997 | Johnson et al. |
| 5,621,812 A | 4/1997 | Deaton et al. |
| 5,625,276 A | 4/1997 | Scott et al. |
| 5,625,776 A | 4/1997 | Johnson |
| 5,630,068 A | 5/1997 | Vela et al. |
| 5,631,544 A | 5/1997 | Syverson et al. |
| 5,636,346 A | 6/1997 | Saxe |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,656,922 A | 8/1997 | LaVelle et al. |
| 5,659,469 A | 8/1997 | Deaton et al. |
| 5,675,662 A | 10/1997 | Deaton et al. |
| 5,679,940 A | 10/1997 | Templeton et al. |
| 5,687,322 A | 11/1997 | Deaton et al. |
| 5,687,372 A | 11/1997 | Hotea et al. |
| 5,689,553 A | 11/1997 | Ahuja et al. |
| 5,701,400 A | 12/1997 | Amado |
| 5,710,887 A | 1/1998 | Chelliah et al. |
| 5,713,851 A | 2/1998 | Boudewijn et al. |
| 5,715,399 A | 2/1998 | Bezos |
| 5,717,923 A | 2/1998 | Dedrick |
| 5,721,583 A | 2/1998 | Harada et al. |
| 5,721,832 A | 2/1998 | Westrope et al. |
| 5,727,163 A | 3/1998 | Bezos |
| 5,732,265 A | 3/1998 | Dewitt et al. |
| 5,732,398 A | 3/1998 | Tagawa |
| 5,732,400 A | 3/1998 | Mandler et al. |
| 5,740,035 A | 4/1998 | Cohen et al. |
| 5,740,252 A | 4/1998 | Minor et al. |
| 5,740,549 A | 4/1998 | Reilly et al. |
| 5,742,929 A | 4/1998 | Kallman et al. |
| 5,745,681 A | 4/1998 | Levine et al. |
| 5,748,907 A | 5/1998 | Crane |
| 5,748,908 A | 5/1998 | Yu |
| 5,749,081 A | 5/1998 | Whiteis |
| 5,754,938 A | 5/1998 | Herz et al. |
| 5,758,257 A | 5/1998 | Herz |
| 5,758,328 A | 5/1998 | Giovannoli |
| 5,761,601 A | 6/1998 | Nemirofsky et al. |
| 5,774,670 A | 6/1998 | Montulli |
| 5,774,868 A | 6/1998 | Cragun et al. |
| 5,778,178 A | 7/1998 | Arunachalam |
| 5,780,133 A | 7/1998 | Engstrom |
| 5,790,793 A | 8/1998 | Higley |
| 5,790,935 A | 8/1998 | Payton |
| 5,794,207 A | 8/1998 | Walker et al. |
| 5,794,209 A | 8/1998 | Agrawal et al. |
| 5,796,967 A | 8/1998 | Filepp et al. |
| 5,806,045 A | 9/1998 | Biorge et al. |
| 5,815,665 A | 9/1998 | Teper et al. |
| 5,821,513 A | 10/1998 | O'Hagan et al. |
| 5,826,240 A | 10/1998 | Brockman et al. |
| 5,838,314 A | 11/1998 | Neel et al. |
| 5,842,199 A | 11/1998 | Miller et al. |
| 5,845,263 A | 12/1998 | Camaisa et al. |
| 5,848,396 A | 12/1998 | Gerace |
| 5,855,008 A | 12/1998 | Goldhaber et al. |
| 5,857,175 A | 1/1999 | Day et al. |
| 5,870,721 A | 2/1999 | Norris |
| 5,870,724 A | 2/1999 | Lawlor et al. |
| 5,873,068 A | 2/1999 | Beaumont et al. |
| 5,878,401 A | 3/1999 | Joseph |
| 5,878,403 A | 3/1999 | DeFrancesco et al. |
| 5,890,137 A | 3/1999 | Koreeda |
| 5,893,075 A | 4/1999 | Plainfield et al. |
| 5,905,973 A | 5/1999 | Yonezawa et al. |
| 5,905,974 A | 5/1999 | Fraser et al. |
| 5,909,492 A | 6/1999 | Payne et al. |
| 5,914,472 A | 6/1999 | Foladare et al. |
| 5,915,243 A | 6/1999 | Smolen |
| 5,918,213 A | 6/1999 | Bernard et al. |
| 5,926,796 A | 7/1999 | Walker et al. |
| 5,933,811 A | 8/1999 | Angles et al. |
| 5,937,390 A | 8/1999 | Hyodo |
| 5,940,495 A | 8/1999 | Bondarenko et al. |
| 5,940,809 A | 8/1999 | Musmanno et al. |
| 5,948,061 A | 9/1999 | Merriman et al. |
| 5,970,469 A | 10/1999 | Scroggie et al. |
| 5,970,473 A | 10/1999 | Gerszberg et al. |
| 5,983,069 A | 11/1999 | Cho et al. |
| 5,991,735 A | 11/1999 | Gerace |
| 5,999,914 A | 12/1999 | Blinn et al. |
| 6,009,411 A | 12/1999 | Kepecs |
| 6,010,669 A | 1/2000 | Miola et al. |
| 6,014,634 A | 1/2000 | Scroggie et al. |
| 6,014,638 A | 1/2000 | Burge et al. |
| 6,018,578 A | 1/2000 | Bondarenko et al. |
| 6,018,587 A | 1/2000 | Cabib |
| 6,018,715 A | 1/2000 | Lynch |
| 6,020,883 A | 2/2000 | Herz et al. |
| 6,026,370 A | 2/2000 | Jermyn |

(56) References Cited

U.S. PATENT DOCUMENTS

| | | |
|---|---|---|
| 6,029,141 A | 2/2000 | Bezos et al. |
| 6,029,149 A | 2/2000 | Dykstra et al. |
| 6,035,288 A | 3/2000 | Solomon |
| 6,055,513 A | 4/2000 | Katz et al. |
| 6,064,980 A | 5/2000 | Jacobi et al. |
| 6,064,987 A | 5/2000 | Walker et al. |
| 6,075,551 A | 6/2000 | Berezowski et al. |
| 6,078,896 A | 6/2000 | Kaehler et al. |
| 6,081,788 A | 6/2000 | Appleman et al. |
| 6,085,164 A | 7/2000 | Smith et al. |
| 6,086,477 A | 7/2000 | Walker et al. |
| 6,088,686 A | 7/2000 | Walker et al. |
| 6,088,722 A | 7/2000 | Herz et al. |
| 6,091,956 A | 7/2000 | Hollenberg |
| 6,108,493 A | 8/2000 | Miller et al. |
| 6,112,186 A | 8/2000 | Bergh et al. |
| 6,113,493 A | 9/2000 | Walker et al. |
| 6,119,093 A | 9/2000 | Walker et al. |
| 6,119,099 A | 9/2000 | Walker et al. |
| 6,125,356 A | 9/2000 | Brockman et al. |
| 6,128,663 A | 10/2000 | Thomas |
| 6,134,309 A | 10/2000 | Carson |
| 6,134,532 A | 10/2000 | Lazarus et al. |
| 6,135,349 A | 10/2000 | Zirkel |
| 6,138,911 A | 10/2000 | Fredregill et al. |
| 6,144,944 A | 11/2000 | Kurtzman, II et al. |
| 6,144,948 A | 11/2000 | Walker et al. |
| 6,161,059 A | 12/2000 | Tedesco et al. |
| 6,161,103 A | 12/2000 | Rauer et al. |
| 6,167,383 A | 12/2000 | Henson |
| 6,169,542 B1 | 1/2001 | Hooks et al. |
| 6,169,985 B1 | 1/2001 | Almgren et al. |
| 6,177,887 B1 | 1/2001 | Jerome |
| 6,177,931 B1 | 1/2001 | Alexander et al. |
| 6,185,558 B1 | 2/2001 | Bowman et al. |
| 6,196,458 B1 | 3/2001 | Walker et al. |
| 6,198,739 B1 | 3/2001 | Neyman et al. |
| 6,199,762 B1 | 3/2001 | Hohle |
| 6,202,334 B1 | 3/2001 | Reynolds et al. |
| 6,216,111 B1 | 4/2001 | Walker et al. |
| 6,223,163 B1 | 4/2001 | Van Luchene |
| 6,226,624 B1 | 5/2001 | Watson et al. |
| 6,236,978 B1 | 5/2001 | Tuzhilin |
| 6,242,706 B1 | 6/2001 | Miyata |
| 6,248,946 B1 | 6/2001 | Dwek |
| 6,256,614 B1 | 7/2001 | Wecker et al. |
| 6,266,649 B1 | 7/2001 | Linden et al. |
| 6,266,668 B1 | 7/2001 | Vanderveldt et al. |
| 6,282,548 B1 | 8/2001 | Burner et al. |
| 6,298,331 B1 | 10/2001 | Walker et al. |
| 6,298,348 B1 | 10/2001 | Eldering |
| 6,314,089 B1 | 11/2001 | Szlam et al. |
| 6,317,718 B1 | 11/2001 | Fano |
| 6,317,722 B1 | 11/2001 | Jacobi et al. |
| 6,317,723 B1 | 11/2001 | Walker et al. |
| 6,321,221 B1 | 11/2001 | Bieganski |
| 6,330,548 B1 | 12/2001 | Walker et al. |
| 6,332,126 B1 | 12/2001 | Peirce et al. |
| 6,334,108 B1 | 12/2001 | Deaton et al. |
| 6,334,112 B1 | 12/2001 | Walker et al. |
| 6,334,113 B1 | 12/2001 | Walker et al. |
| 6,334,127 B1 | 12/2001 | Bieganski et al. |
| 6,336,099 B1 | 1/2002 | Barnett et al. |
| 6,336,104 B1 | 1/2002 | Walker et al. |
| 6,337,904 B1 | 1/2002 | Gisby |
| 6,351,736 B1 | 2/2002 | Weisberg et al. |
| 6,353,390 B1 | 3/2002 | Beri et al. |
| 6,356,838 B1 | 3/2002 | Paul |
| 6,369,840 B1 | 4/2002 | Barnett et al. |
| 6,381,583 B1 | 4/2002 | Kenney |
| 6,389,337 B1 | 5/2002 | Kolls |
| 6,397,057 B1 | 5/2002 | Malackowski et al. |
| 6,397,193 B1 | 5/2002 | Walker et al. |
| 6,405,174 B1 | 6/2002 | Walker et al. |
| 6,405,181 B2 | 6/2002 | Lent et al. |
| 6,424,706 B1 | 7/2002 | Katz et al. |
| 6,424,949 B1 | 7/2002 | Deaton et al. |
| 6,434,231 B2 | 8/2002 | Neyman et al. |
| 6,434,532 B2 | 8/2002 | Goldband et al. |
| 6,434,534 B1 | 8/2002 | Walker et al. |
| 6,460,036 B1 | 10/2002 | Herz |
| 6,501,832 B1 | 12/2002 | Saylor et al. |
| 6,505,619 B2 | 1/2003 | Hulm |
| 6,526,335 B1 | 2/2003 | Treyz et al. |
| 6,543,209 B1 | 4/2003 | Siegel et al. |
| 6,546,193 B1 | 4/2003 | Um et al. |
| 6,553,178 B2 | 4/2003 | Abecassis |
| 6,567,787 B1 | 5/2003 | Walker et al. |
| 6,571,279 B1 | 5/2003 | Herz et al. |
| 6,574,614 B1 | 6/2003 | Kesel |
| 6,598,024 B1 | 7/2003 | Walker et al. |
| 6,598,026 B1 | 7/2003 | Ojha et al. |
| 6,650,758 B1 | 11/2003 | Van Schyndel |
| 6,665,837 B1 | 12/2003 | Dean et al. |
| 6,671,879 B1 | 12/2003 | Schlarb et al. |
| 6,694,300 B1 | 2/2004 | Walker et al. |
| 6,698,020 B1 | 2/2004 | Zigmond et al. |
| 6,701,317 B1 | 3/2004 | Wiener et al. |
| 6,704,727 B1 | 3/2004 | Kravets |
| 6,718,551 B1 | 4/2004 | Swix et al. |
| 6,756,997 B1 | 6/2004 | Ward, III et al. |
| 6,760,727 B1 | 7/2004 | Schroeder et al. |
| 6,773,351 B2 | 8/2004 | Brown |
| 6,782,370 B1 | 8/2004 | Stack |
| 6,813,777 B1 | 11/2004 | Weinberger et al. |
| 6,823,319 B1 | 11/2004 | Lynch et al. |
| 6,850,209 B2 | 2/2005 | Mankins et al. |
| 6,941,574 B1 | 9/2005 | Broadwin et al. |
| 6,942,143 B1 | 9/2005 | Iida et al. |
| 6,950,986 B1 | 9/2005 | Jacobi, Jr. et al. |
| 6,954,732 B1 | 10/2005 | DeLapa et al. |
| 7,016,864 B1 | 3/2006 | Notz et al. |
| 7,054,830 B1 | 5/2006 | Eggleston et al. |
| 7,072,849 B1 | 7/2006 | Filepp et al. |
| 7,117,172 B1 | 10/2006 | Black |
| 7,167,711 B1 | 1/2007 | Dennis |
| 7,233,912 B2 | 6/2007 | Walker et al. |
| 7,249,050 B1 | 7/2007 | Walker et al. |
| 7,280,979 B1 | 10/2007 | Katz et al. |
| 7,356,486 B2 | 4/2008 | Sullivan et al. |
| 7,386,485 B1 | 6/2008 | Mussman et al. |
| 7,427,233 B2 | 9/2008 | Walker et al. |
| 7,437,313 B1 | 10/2008 | Mussman et al. |
| 7,509,274 B2 | 3/2009 | Kam et al. |
| 7,522,554 B2 | 4/2009 | Chan |
| 7,729,945 B1 | 6/2010 | Katz et al. |
| 7,792,702 B1 | 9/2010 | Katz et al. |
| 7,822,647 B1 | 10/2010 | Mussman et al. |
| 7,822,847 B2 | 10/2010 | Kusama et al. |
| 7,853,488 B1 | 12/2010 | Mussman et al. |
| 8,078,503 B1 | 12/2011 | Mussman et al. |
| 2001/0001854 A1 | 5/2001 | Schena et al. |
| 2001/0012439 A1 | 8/2001 | Young et al. |
| 2001/0014868 A1 | 8/2001 | Herz et al. |
| 2001/0032137 A1 | 10/2001 | Bennett et al. |
| 2001/0032192 A1 | 10/2001 | Putta et al. |
| 2001/0034718 A1 | 10/2001 | Shaked et al. |
| 2001/0034720 A1 | 10/2001 | Armes |
| 2001/0037207 A1 | 11/2001 | Dejaeger |
| 2001/0037288 A1 | 11/2001 | Bennett et al. |
| 2001/0039516 A1 | 11/2001 | Bennett et al. |
| 2001/0042016 A1 | 11/2001 | Muyres et al. |
| 2001/0044742 A1 | 11/2001 | Ko et al. |
| 2001/0047307 A1 | 11/2001 | Bennett et al. |
| 2002/0012428 A1 | 1/2002 | Neyman et al. |
| 2002/0023272 A1 | 2/2002 | Pocock |
| 2002/0026351 A1 | 2/2002 | Coleman |
| 2002/0026394 A1 | 2/2002 | Savage et al. |
| 2002/0026478 A1 | 2/2002 | Rodgers et al. |
| 2002/0026496 A1 | 2/2002 | Boyer et al. |
| 2002/0035615 A1 | 3/2002 | Ullman et al. |
| 2002/0046124 A1 | 4/2002 | Alderucci et al. |
| 2002/0055906 A1 | 5/2002 | Katz et al. |
| 2002/0077960 A1 | 6/2002 | Kiely et al. |

(56) References Cited

U.S. PATENT DOCUMENTS

| | | |
|---|---|---|
| 2002/0091632 A1 | 7/2002 | Turock et al. |
| 2002/0111867 A1 | 8/2002 | Walker et al. |
| 2002/0116260 A1 | 8/2002 | Szabo et al. |
| 2002/0116282 A1 | 8/2002 | Martin et al. |
| 2002/0120496 A1 | 8/2002 | Scroggie et al. |
| 2002/0120519 A1 | 8/2002 | Martin et al. |
| 2002/0156699 A1 | 10/2002 | Gray et al. |
| 2002/0156700 A1 | 10/2002 | Gray et al. |
| 2002/0169687 A1 | 11/2002 | Perkowski |
| 2002/0188511 A1 | 12/2002 | Johnson et al. |
| 2003/0130904 A1 | 7/2003 | Katz et al. |
| 2003/0172000 A1 | 9/2003 | Foster |
| 2003/0196204 A1 | 10/2003 | Thiagarajan et al. |
| 2003/0229897 A1 | 12/2003 | Frisco et al. |
| 2004/0019900 A1 | 1/2004 | Knightbridge et al. |
| 2004/0047935 A1 | 3/2004 | Moss et al. |
| 2004/0143838 A1 | 7/2004 | Rose |
| 2005/0018574 A1 | 1/2005 | Jenkins et al. |
| 2005/0055717 A1 | 3/2005 | Daniels |
| 2005/0132404 A1 | 6/2005 | Clapp |
| 2005/0198677 A1 | 9/2005 | Lewis |
| 2005/0216940 A1 | 9/2005 | Black |
| 2009/0070833 A1 | 3/2009 | Rolf |

FOREIGN PATENT DOCUMENTS

| | | |
|---|---|---|
| EP | 0751471 A1 | 1/1997 |
| EP | 0827063 A1 | 3/1998 |
| GB | 2326925 A | 1/1999 |
| GB | 2336925 A | 11/1999 |
| WO | 9421084 A1 | 9/1994 |
| WO | 9720279 A1 | 6/1997 |
| WO | 9721183 A1 | 6/1997 |
| WO | 9833135 A1 | 7/1998 |
| WO | 9834149 A1 | 8/1998 |
| WO | 9834189 A1 | 8/1998 |
| WO | 9840832 A2 | 9/1998 |
| WO | 9843149 A2 | 10/1998 |
| WO | 9844699 A1 | 10/1998 |
| WO | 9853406 A1 | 11/1998 |
| WO | 9858334 A1 | 12/1998 |
| WO | 9906914 A2 | 2/1999 |
| WO | 99/13424 | 3/1999 |
| WO | 9910794 A2 | 3/1999 |
| WO | 9911006 A2 | 3/1999 |
| WO | 9911007 A2 | 3/1999 |
| WO | 9919809 A2 | 4/1999 |
| WO | 9946706 A1 | 9/1999 |
| WO | 9966438 A1 | 12/1999 |
| WO | 0000916 A1 | 1/2000 |
| WO | 0010069 A2 | 2/2000 |
| WO | 0021005 A1 | 4/2000 |
| WO | 0033222 A1 | 6/2000 |
| WO | 0034910 A2 | 6/2000 |
| WO | 0038122 A1 | 6/2000 |
| WO | 0046720 | 8/2000 |
| WO | 0046720 A2 | 8/2000 |
| WO | 0051050 A1 | 8/2000 |
| WO | 0124032 A2 | 4/2001 |
| WO | 0137183 A1 | 5/2001 |
| WO | 0137193 A1 | 5/2001 |
| WO | 0171683 A2 | 9/2001 |
| WO | 0193119 A1 | 12/2001 |
| WO | 0205122 | 1/2002 |
| WO | 0205122 A2 | 1/2002 |
| WO | 0208997 | 1/2002 |
| WO | 0208997 A1 | 1/2002 |
| WO | 0219203 A2 | 3/2002 |
| WO | 0225909 A2 | 3/2002 |

OTHER PUBLICATIONS

U.S. Appl. No. 02/0077,960 filed Jun. 20, 2002, Kiely et al.
U.S. Appl. No. 02/0091,632, filed Jul. 11, 2002, Turock et al.
U.S. Appl. No. 02/0188,511, filed Dec. 12, 2002, Johnson et al.
U.S. Appl. No. 09/505,619, filed Feb. 16, 2000, Katz et al.
U.S. Appl. No. 09/691,392, filed Oct. 17, 2000.
U.S. Appl. No. 09/907,724, filed Jul. 17, 2001.
U.S. Appl. No. 10/355,060, filed Dec. 31, 2002.
U.S. Appl. No. 10/403,822, filed Mar. 3, 2003.
Wagner [Wagner, Lon (Staff Writer); Fry Fight As Fast-Food Chains Face Off With French Fries, We Weigh The Issue For You; Virginian-Pilot, Norfolk, Va; Apr. 6, 1997 extracted on Internet from Proquest Database].
Whelan, Carolyn Electronic News. "DirectTV chooses ATI after AT&T deal folds" New York. Dec. 15, 1997. vol. 43, Iss. 2198. p. 44, 1 pgs.
Wink, Documents from www.wink.com, Sep. 16, 2002.
Kristi Heim; "Smart Cards Could Present Privacy Threat"; Asian Wall Street Journal; New York, N.Y.; Mar 9, 1998; p. 1.
Kuffel, Chris Mobile Commerce: Money Keeps Rolling In, International Herald Tribune, Oct. 13, 2003.
Levine, Kay. Anchorage Daily News. Troubleshooter; [Final Edition 30]. Anchorage, Alaska. Jul. 16, 1991. p. B.2.
Lisa Chiranky, Web Power: Taking Call Centers to New Dimensions, Internet & Call Center Solutions, www.tmcnet.com, 1997.
M2 Presswire. "FIJITSU: Fijitsu introduces developer's toolkit for Edify Electronic Workforce platform". Coventry. Mar. 3, 1998, p. 1.
M2 Presswire. "FIJITSU: Fijitsu introduces developer's toolkit for Edify Electronic Workforce platform". Coventry. Mar. 3, 1998. p. 1.
Maltz, David, Pointing The Way: Active Collaborative Filtering, CHI '95 Proceeding Papers.
Markoff, et al., In Searching the Web, Google Finds Riches, The New York Times, Apr. 13, 2003.
McMains, Andrew, Weiss, Whitten, Stagliano's, AdWeek Eastern Edition, Jun. 1998, p. 82, vol. 39, No. 24.
Meece, Mickey; "Fertile Sales Turf: Fee-Based Card Services Memberworks' Gary Johnson Counts the Way He Can Sell to Cardholders," American Banker, v162n68 p. 15, 4 pgs.
Meece, Mickey; "Fertile Sales Turf: Fee-Based Card Services Memberworks' Gary Johnson Counts the Way He Can Sell to Cardholders," American Banker, v162n68p. 15, 4 pgs, 1997.
Meece, Mickey; "Fertile Sales Turf: Fee-Based Card Services Memberworks' Gary Johnson Counts the Way He Can Sell to Cardholders," American Banker, v162n68pg15, 4 pgs, Apr. 20, 1997.
Meeks, Fleming, The Future Of The Future, Barron's, Nov. 13, 2002, pp. V5-V8.
Middleton, T., "IT Stars in Video Chain's Roolout, Blockbuster Integrates Customer Data on Multiple Platforms", Jan. 30, 1995.
Middleton, Timothy, IT Stars in Video Chain's Rollout, www.iweek.com, Jan. 30, 1995.
Miller, Bradley N., Experiences with GroupLens: Making Usenet Useful Again, University of Minnesota, Abstract.
MIVA, Documents from www.miva.com, Sep. 18, 2002.
Moxon, Bruce, Data Mining: The Golden Promise, www.oreview.com, 1997, pp. 1-14.
Nadji Tehrani, Hardware, Software . . . Humanware, Telemarketing & Call Center Solutions, Sep. 1997, p. 4, v. 16, 3.
Nash, Edward L., Direct Marketing, Strategy, Planning, Execution, Third Edition McGraw-Hill, Inc., 1995, pp. 164-165, 364-367.
Net Perceptions, Building Customer Loyalty And High-Yield Relationships Through GroupLens Collaborative Filtering, White Paper, Nov. 19, 1996, pp. 1-9.
Nett, Walt, Sweet Deals Can Lull The Unaware Credit Card User, Arizona Daily Star, Jun. 19, 1994, p. 1.D.
Nicholas Booth; "Bargains Galore at the Sale of the New Century"; The Times; London (UK); Jan. 7, 1998; pg. Interfa.
Nielsen Media Research, Who We Are and What We Do, www.nielsenmedia.com.
Paragren Website Printouts dated Jun. 30, 1998.
Peppers, et al., The One to One Future Building Relationships One Customer at a Time, copyright 1993, 1996, pp. 3-17; 40-43.
Perkins [Perkins, Ed; "Consumer Reports On Travel Careful shopping will avoid bait-and-switch promotions"; The Atlanta Constitution; Atlanta, Ga; Jan. 4, 1995 extracted on Internet from Proquest Database].

(56) References Cited

OTHER PUBLICATIONS

Perkins, Ed; Consumer Reports On Travel Careful Shopping Will Avoid Bait-and-Switch Promotions; The Atlanta Constitution; Atlanta, GA; Jan. 4, 1995 extracted on Internet from Proquest Database.
Posko, J.L., "Versatile Services Streamline Global Videoconferencing", AT&T Technology Products, Systems and Services, vol. 7, No. 3, pp. 2-8, Fall, 1992.
Reilly, Brian. Advertising Age's Business Marketing. "Upselling strategies hit the net" Chicago. Dec. 1996. vol. 81, Iss. 10. p. M1, 2 pgs.
Resnick, Paul, GroupLens: An Open Architecture For Collaborative Filtering Of Netnews, Proceedings of the ACM 1994 Conference on Computer Supported Cooperative Work, Abstract, pp. 175-186.
Robinson, Phillip; "Laptop and palmtop computers have disadvantages but also some nice pluses"; Austin American Statesman; Austin, Tex; Mar. 9, 1992 extracted on Internet from Proquest database.
Rucker, James, Siteseer: Personalized Navigation for the Web, Communications of the ACM, Mar. 1997, pp. 73-76, vol. 40, No. 3.
Santi, Albert, Encyclopedia of Mortgage and Real Estate Finance, Jan. 1998, Mortgage Bankers Association of America's Real Estate Finance Press, Revised Edition, pp. 213 & 218.
SAS, Documents from www.sas.com, Sep. 16, 2002.
Schwartau, Winn; "New Keys to Network Security"; InfoWorld; San Mateo; May 15, 1995; vol. 17 Iss 20; p. 51, 2 pgs.
Shardanand, Upendra, Social Information Filtering: Algorithms For Automating, "Word Of Mouth", MIT Media Lab, Abstract.
Simon Calder; "Free Ticket From Timeshare Offer Scam"; The Independent; London (UK); Jul 8, 1995, p. 17.
SKYGO, www.skygo.com, Mar. 16, 2001.
Steel, James; "Combating Counterfeit Credit Cards: The Technological Challe," Credit World, May/Jun. 1995, v83n5pg16, 3 pgs.
Stern, Linda. Home Office Computing. "Save $60K this year". Boulder. Jan. 1998. vol. 16, Iss. 1. p. 58, 6 pgs.
Tedeschi, Bob, E-Commerce Report; Demand Among Marketers For Advertising Next to Search Results Could Soon Outpace Supply, The New York Times, Jul. 19, 2004.
Tehrani, Nadji, Hardware, Software . . . Humanware, Telemarketing & Call Center Solutions, Sep. 1, 1997, p. 4, vol. 16, No. 3.
Terveen, Loren, Phoaks: A System for Sharing Recommendations Communications of the ACM, Mar. 1997, pp. 59-62, vol. 40, No. 3.
Thearling, Kurt, "From Data Mining to Database Marketing", DIG White Paper, Feb. 1995.
Throne, Adam: "Capital One's Call Center Soars to New Heights," Call Center Magazine, Mar. 2001, v14n3pg84, 4 pgs.
Throne, Adam; "Capital One's Call Center Soars to New Heights," Call Center Magazine, Mar. 2001, v14n3p. 84, 4 pgs.
U.S. Appl. No. 02/0012,428, filed Jan. 31, 2002, Neyman et al.
U.S. Appl. No. 02/0023,272, filed Feb. 21, 2002, Pocock.
U.S. Appl. No. 02/0026,394, filed Feb. 28, 2002, Savage et al.
CMF: Lumpur, Kuala; "Credit Card Ties Up With Alumni Life," Jan. 2, 1996, 2 pgs.
"Amtech Corp. Shares Plummet After Losing 3-State Bid"; Austin American Statesman; Austin, Tex; Mar 22, 1994; p. E.7.
"Call Center Magazine Names Versatility Campaign Plus Product of hte Year". PR Newswire, Feb. 12, 1997. [recovered from Dialog Databas on Apr. 6, 2007].
"Fingerhut Exploits Add-On Phone Sales". Direct., vol. 0, No. 0. p. 22. Aug. 1994.
"Play it safe " article extracted from Dialog Database on Feb. 13, 2012: Dialog # 6/9/2 (Item 2 from file 47) 03403035 ? ? Supplier No. 08795143.
"Potent New Tool for Selling", Business Week, Sep. 5, 1994.
"Targeting and reaching the right customers more effectively". Galenskas, Stephanie. Direct Marketing. May 1997. [recovered from Dialog database on Apr. 6, 2007].
1-800-future: What to do when tomorrow's consumers call. Charlotte R Otto. Vital Speeches of the Day. New York: Jun. 15, 1997. vol. 63, Iss. 17; p. 523, 6 pgs.

A System for Sharing Recommendations, Communications of the ACM, Mar. 1997/vol. 40, No. 3, pp. 59-62.
Able Solutions, Able Solutions Announces AbleCommerce 2.6, PR Newswire, Sep. 15, 1998.
Active Decisions, www2.activebuyersguide.com, Sep. 17, 2002.
ACTV, Inc., Documents from www.actv.com, Apr. 23, 2002.
Acxiom, Documents from www.acxiom.com, Sep. 18, 2002.
Alta Vista, Alta Vista Alters Its Vision Of The Market, Wall Street Journal, Abstract, Dec. 18, 1996.
Amazon.com Website Printout dated Feb. 22, 1998.
Amazon.com Website Printout dated Feb. 24, 1998.
Amazon.com, Website Prinout. www.amazon.com, Feb. 22, 1998.
Amazon.com, Website Printout, www.amazon.com, Feb. 24, 1998.
Amazon.com, Website Printout, www.amazon.com, Jul. 8, 1998.
Amdocs, Documents from www.amdocs.com, Sep. 18, 2002.
Angiolillo, J., Personal Visual Communications Enters The Marketplace, AT&T Technology Products, Systems & Services, Feb. 21, 1992, pp. 18-28, Issue 7,3.
Anonymous; "Debit Goes to Dinner"; Credit Card Management; New York; Oct. 1994; vol. 7, Iss 7, p. 20, 2 pgs.
Anonymous; "New replacement Service Saves Insurers Money, Satisfies Insured"; Canadian Insurance; Toronto; Aug. 1982; extracted on Internet from Proquest database.
Arbor Software, www.arborsoft.com, Jun. 30, 1998.
Avery, Christopher, Recommender Systems for Evaluating Computer Messages, Communications from the ACM, Mar. 1997, pp. 88-89, vol. 40, No. 3.
Balabanovic, Marko, Fab: Content-Based, Collaborative Recommendation, Communications of the ACM, Mar. 1997, pp. 66-72, vol. 40, No. 3.
Baran, Paul, Some Changes in Information Technology Affecting Marketing in the Year 2000, Changing Marketing Systems, 1967 Winter Conference, Dec. 27-29, 1967, pp. 76-77, No. 26.
Barrios, Jennifer, Billboards That Know You, The New York Times, Dec. 14, 2003, p. 55.
Be Free, Documents from www.befree.com, Sep. 18, 2002.
Berry, Jonathan, Database Marketing: A Potent New Tool for Selling, Business Week, Sep. 5, 1994, p. 56, issue 3388.
Binkley, Christina, Soon, The Desk Clerk Will Know All About You, Wall Street Journal, May 8, 2003, p. D4.
Bloomberg; "Web Sites Help Consumers Shop for Hard-to-find Credit Card Deals," Las Vegas Journal, Feb. 28, 1999, 3 pgs.
Brier, Steven E., Smart Devices Peep Into Your Grocery Cart, New York Times, Jul. 16, 1998, section G, p. 3, col. 3.
Brittan, David, "Being There—The Promise of Multimedia Communications", Technology Review, pp. 43-50, May/Jun., 1992.
Brittan, David, "Being There—The Promise of Multimedia Communications", Technology Review, pp. 45-50, May/Jun. 1992.
Brittan, David, Being There—The Promise of Multimedia Communications, Technology Review, May 6, 1992, pp. 43-50.
Bruce Moxon, Data Mining: The Golden Promise, www.oreview.com, 1997, pp. 1-14.
Bruno, Michael, MicroCreditCard To Launch Micro Payment Service, Wastech.com, Aug. 29, 2000.
Burkhead, J., Fidelity Investments Letter to Investors, Feb. 1, 1998.
Business Logic, www.blogicsys.com, Sep. 16, 2002.
Business Objects, www.businessobjects.com, Sep. 18, 2002.
Cameron, Paul S., Appendix A to Patent No. 5,592,378.
CDNOW, CDNow Rated Top Music Site by eMarketer, the Authority on Business Online, PR Newswire, Sep. 3, 1998.
Cerbone, R., The Coming HDTV Wave, AT&T Technology Products, Systems & Services, Feb. 1, 1992, pp. 14-17, issue 7, 3.
Charles Schwab, Asset Allocation Toolkit, Website, Feb. 20, 1998.
Chiranky, Lisa, Web Power: Taking Call Centers To New Dimensions, Internet & Call Center Solutions, www.tmcnet.com, 1997.
CLICK2BOOST, www.click2boost.com, Sep. 17, 2002.
CMF: Associated Press; "Telemarketing Firm Agrees to Alter Sales Policy," Times Union, Sep. 19, 2002, 2 pgs.
CNN, Software To Limit Tracking Cell Phone Users, www.cnn.com, Jan. 19, 2004.
CNN, Software To Limit Tracking Cell Phones Users, www.cnn.com, Jan. 19, 2004.
Convergys, www.convergys.com, Oct. 8, 2002.

(56) References Cited

OTHER PUBLICATIONS

Corporate America's Secret Weapon. Worldwide, Williams. Brandweek, p. 12(1). Sep. 7, 1998. ISSN: 1064-4318. [recovered from Dialog Database on May 6, 2008].
COSMOCOM, Computer Telephony, Jul. 1998.
CYCORP, www.cyc.com, Sep. 18, 2002.
Delgado, Joaquin, Content-Based collaborative Information Filtering: Actively Learning To Classify And Recommend Documents, Nagoya Institute of Technology, Abstract, 1998.
Delgado, Joaquin, Intelligent Collaborative Information Retieval, Nagoya Institute of Technology, Abstract, 1998.
DoubleClick in Double Trouble, Yahoo News, Feb. 19, 1998.
DoubleClick on New Media Buying, Abstract from Inside Media (1996).
DoubleClick, Documents from www.doubleclick.com, Sep. 16, 2002.
Doubleclick, DoubleClick On New Media Buying, Inside Media, Abstract, Feb. 7, 1996.
Dragan, Richard, Advice From the Web, PC Magazine, Sep. 9, 1997, p. 133(7), vol. 16, No. 15.
E.Piphany, www.epiphany.com, Sep. 18, 2002.
Elliott, Christopher, Hotels Get Pushy About Their Loyalty Programs, The New York Times, Jun. 1, 2004, p. C7.
Englander, A.C., "Creating Tomorrow's Multimedia Systems Today", AT&T Technology Products, Systems and Services, vol. 7, No. 3, pp. 24-30, Fall, 1992.
Ensor, J. R., "The Rapport Multimedia Conferencing System—A Software Overview", IEEE, pp. 52-58 1992.
Faloutsos, Christos, A Survey Of Information Retrieval And Filtering Methods, University of Maryland, Abstract, pp. 1-22, 1995.
Fano, Andrew E., Shopper's Eye: Using Location-Based Filtering for a Shopping Agent in The Physical World, Second International Conference on Autonomous Agents, 1998.
Fitzgerald, Kate; "Putting Tech Into Telemarketing," Credit Card Management, Jul. 1999, v12n4pg34, 8 pgs.
Freeman, Laurie; "Supermarkets Sift Through Data"; Advertising Age. (Midwest region edition); Chicago; Oct. 10, 1994. vol. 65, Iss. 43; p. S16, 1 pgs.
Gaither, Chris, Google designs an Engine for Eggheads; Los Angeles Times, Oct. 27, 2004.
Galvin, Brian. Telemarketing & Call Center Solutions. "Focus On: The Inbond call center outlook—how emerging technologies will change your business". Norwalk. Apr. 1997. vol. 15, Iss. 10. p. 24, 5 pgs.
Galvin, Brian. Telemarketing & Call Center Solutions. "Focus On: The Inbound call center outlook—how emerging technologies will change your business". Norwalk. Apr. 1997. vol. 15, Iss. 10. p. 24, 5 pgs.
Geller, Lois Direct Marketing. "10 ways to joggle you out of your direct marketing doldrums" Garden City, Feb. 1998. vol. 60 Iss. 10 p. 18, 4 pgs.
Geller, Lois. Direct Marketing. "10 ways to joggle you out of your direct marketing doldrums". Garden City. Feb. 1998. vol. 60, Iss. 10. p. 18, 4 pgs.
Gemstar-TV, www.gemstartvguide.com, Dec. 14, 2001.
Goldpocket, www.goldpocket.com, Sep. 17, 2002.
Green, Heather, The Information Gold Mine, Business Week e.biz, 1999.
Harvey, D.E., "Videoconferencing Systems: Seeing Is Believing", AT&T Technology Products, Systems and Services, vol. 7, No. 3, pp. 7-13, Fall, 1992.
Hays, Laurie, "Using Computers to Divine Who Might buy a Gas Grill", Wall Street Journal, Aug. 16, 1994.
Heiman, Christopher, Now Hear This, Forbes, Sep. 15, 2003, pp. 122-124, v. 172, No. 5.
Heiman, Christopher, Now Hear This, Forbes, Sep. 15, 2003, pp. 122-134, vol. 172, No. 5.
HFN The Weekly Newspaper for the Home Furnishing Network. "IMRA ponders retail future shock". International Mass Retail Association. Erlick, June Carolyn. p. p11(1) vol. V69 No. N21 ISSN: 1082-0310. May 22, 1995.
Hill, Kimberly, Autonomy Digs into Contact-Center Market, CRMDaily.com, May 20, 2003.
Hill, Kimberly, Autonomy Digs Into Contact-Center Market, www.crmdaily.com, May 20, 2003.
iCat, iCat Electronic Commerce Suite Takes "Best of Show" Award at WebINNOVATION 97, PR Newswire, Jun. 24, 1997.
iCat, iCat's Commerce Suite Makes Setting up Show on the 'net Even Easier Than High Street, M2 Presswire, Feb. 19, 1997.
Internet World, IBM to Expand E-Comm Features. Newsbytes News Network. Dec. 16, 1996.
Kalakota et al., "Electronic Commerce: A Manager's Guide", Addison-Wesley Longman, 1996.
Karas, Nick; Cars and Boats: A Natural Mix at Nissan[Nassau and Suffok Edition]; Newsday; Long Island, N.Y.; Mar. 19, 1989, extracted on Internet from Proquest database.
Kautz, Henry, Referral Web: Combining Social Networks and Collaborative Filtering, Communications of the ACM, Mar. 1997, pp. 63-65, vol. 40, No. 3.
Kislik, Elizabeth Catalog Age. "Beyond the thought that counts". New Canaan. Jul. 1997 vol. 14, Iss. 7, p. 199, 2 pgs.
Kislik, Elizabeth. Catalog Age. "Beyond the thought that counts". New Canaan. Jul. 1997. vol. 14, Iss. 7, p. 199, 2 pgs.
Knapp, Adam L., OmniSky Israel—Tracking Urban Nomads, www.accenture.com, Apr. 8, 2003.
Knapp, Adam, OmniSky Israel—Tracking Urban Nomads, www.accenture.com, Apr. 8, 2003.
Kohda et al., "Ubiquitous Advertising on the WWW: Merging Advertisement on the Browser", Proceedings of the Fifth International World Wide Web Conference, May 1996 (France).
Konstan, Joseph A., GroupLens: Applying Collaborative Filtering to Usenet News, Communications of the ACM, Mar. 1997, pp. 77-78, No. 3.
Konstan, Joseph, GroupLens: Applying Collaborative Filtering To Usenet News, Communications of the ACM, Mar. 1997, vol. 40, No. 3, pp. 77-78.
KPMG, Documents from www.kpmgconsulting.com, Sep. 18, 2002.

METHOD, PROGRAM STORAGE DEVICE, AND APPARATUS FOR OFFERING A USER A PLURALITY OF SCENARIOS UNDER WHICH TO CONDUCT A PRIMARY TRANSACTION

CROSS-REFERENCE TO RELATED APPLICATIONS

This application is a continuation of U.S. patent application Ser. No. 12/942,426, filed on Nov. 9, 2010, entitled METHOD, PROGRAM STORAGE DEVICE, AND APPARATUS FOR OFFERING A USER A PLURALITY OF SCENARIOS UNDER WHICH TO CONDUCT A PRIMARY TRANSACTION, which is a continuation of U.S. patent application Ser. No. 12/194,189, filed on Aug. 19, 2008, entitled METHOD, PROGRAM STORAGE DEVICE, AND APPARATUS FOR OFFERING A USER A PLURALITY OF SCENARIOS UNDER WHICH TO CONDUCT A PRIMARY TRANSACTION, now issued as U.S. Pat. No. 7,853,488, issued on Dec. 14, 2010, which is a continuation of U.S. patent application Ser. No. 10/335,061, filed on Dec. 31, 2002, now issued as U.S. Pat. No. 7,437,313, issued on Oct. 14, 2008, entitled METHODS, COMPUTER-READABLE MEDIA, AND APPARATUS FOR OFFERING USERS A PLURALITY OF SCENARIOS UNDER WHICH TO CONDUCT AT LEAST ONE PRIMARY TRANSACTION, which is a continuation-in-part of U.S. patent application Ser. No. 09/505,619, filed on Feb. 16, 2000, now issued as U.S. Pat. No. 7,280,979, issued on Oct. 9, 2007, entitled METHODS AND APPARATUS FOR INTELLIGENT SELECTION OF GOODS AND SERVICES IN TELEPHONIC AND ELECTRONIC COMMERCE; which is in turn a continuation of patent application Ser. No. 09/038,399, filed on Mar. 11, 1998, now issued as U.S. Pat. No. 6,055,513, issued on Apr. 25, 2000, entitled METHODS AND APPARATUS FOR INTELLIGENT SELECTION OF GOODS AND SERVICES IN TELEPHONIC AND ELECTRONIC COMMERCE. The applicants hereunder claim the benefit of the filing dates of these applications to the fullest extent permitted by the United States Patent Laws, and these applications are incorporated herein by this reference in their entireties.

BACKGROUND OF THE INVENTION

The invention provides apparatus and methods for effecting remote commerce, such as in telemarketing (either inbound or outbound) and in electronic commerce, which are particularly adapted for the intelligent selection and proffer of products, services or information to a user or customer.

Telemarketing is a well-known form of remote commerce, that is, commerce wherein the person making the sale or taking the sales data is not in the actual physical presence of the potential purchaser or customer. In general operation, a prospective purchaser typically calls a toll-free telephone number, such as an 800 number. The number dialed is associated by the carrier as being associated with the telemarketer, and the dialed number, typically taken automatically from the carrier (long distance) through use of the dialed number identification service (DNIS), is utilized to effect a database access resulting in a "screen pop" of a script on a terminal for the telemarketer. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Typically, the prospective purchaser is responding to an advertisement or other solicitation, such as a mail order catalog or the like, from which the telephone number is obtained.

In a typical telemarketing application, the item for which the caller makes initial contact is the item which is ordered by the customer. In certain instances, attempts are made to sell other goods or services directly related to the product for which contact was made. For example, if the initial contact was for audio recordings from a given singer, the additional offer may relate to yet further recordings from that same singer. Typically, the correlation between the products offered is predefined, and does not vary depending on the caller.

More generally, the term electronic commerce has been utilized in a broad and evolving manner for remote commerce where at least a portion of the customer-to-seller contact is in electronic form. For example, various forms of electronic on-line shopping services exist, as well as Internet based electronic commerce trading sites.

Yet certain of the related art systems fail to offer upsells to the potential customer in real time. Despite the efforts made over a significant period, an effective, useful system for the intelligent, automated provision of goods and services in the telephonic and electronic commerce areas is needed.

BRIEF SUMMARY OF THE INVENTION

In one implementation of the invention, the system and methods obtain input information for the system from a primary transaction, identify one or more goods or services for possible proffer and upsell to the customer based at least in part upon the primary transaction data information provided to the system, and thereafter, offer the user or customer one or more items determined to be among the optimum upsells.

In one aspect of the invention, a method provides offers of an item constituting a good or a service in the form of an offer for purchase of the item to potential customers as users of the system, utilizing an electronic communications device, such as a telephone, videophone or computer, comprising the steps of, first, establishing communication via the electronic communications device between the user and the system for purpose of a primary transaction, second, obtaining primary transaction data with respect to the transaction, including determining the identity of the prospective customer, third, obtaining at least a second data element relating to the user for the upsell determination, fourth, utilizing at least in part the primary transaction data and the second data element and determining at least one good or service item for prospective upsell to the prospective customer, and fifth, offering the item to the prospective customer.

In the preferred implementation of the inventions, the input information for the system includes primary transaction data and at least a second data element obtained from a database, especially a remote, third party database or databases. Primary transaction data may include data relating to or reflecting the initial or primary contact from the customer to the system. In operation, one or more databases may be accessed, either in parallel or series, to collect and assemble input information for the system to determine the upsell or intelligent product selection.

One example of primary transaction data includes transaction determining data, which provides an indication of the purpose of the call, for example, whether the primary contact was for purchase of a product, for a service request or an inquiry. Such transaction determination data may either be used to consummate the primary transaction or not. By way of example, a user initiating remote contact with a source of sales or services might initially contact the source desiring repair of a defective product, whereupon the transaction determination data indicating a repair contact may then be used as an input to the system identifying responses to be proffered. In such a circumstance, while the primary transaction data reflect a service contact, the customer may be offered in response a sales transaction for a new product, which includes the functionalities of the product which formed the basis for the primary transaction.

Yet another aspect of primary transaction data may include customer identification data. Such data may be specific data in that it uniquely identifies the contact, such as in person specific data comprising an electronic address, an e-mail address, customer number, billing data or credit card number. Customer identification data may in some instances be less than person specific data, such as residence specific data. For example, a caller's telephone number, such as may be automatically supplied by the automatic number identification (ANI) service or other forms of caller identification, may identify a customer to the level of a residence. Optionally, additional data may be requested so as to specify a subset, e.g., a unique resident, from the household. At yet a less specific level of geographic granularity, identification data may include zip code data or other geographic identifier. Identification data may be obtained automatically from a carrier, such as through the use of ANI for telephonic communications, or through an electronic identifier for electronic commerce, such as transactions over the Internet. Alternatively, non-automatic entry may be utilized, such as where the customer or operator effects data entry.

Yet further aspects of the input information for the system may include a correlation system for matching primary transaction data or other input data with a corresponding or keyed designator number for obtaining yet further input information. For example, while an initial contact to a telemarketer may automatically obtain the caller's telephone number, such as from ANI, a correlation system may then provide a designator, such as a social security number, which may be utilized as an index or key for accessing yet further data bases or sources of information. For example, a caller's telephone number as provided as primary transaction data via ANI may through the correlation system result in a social security number or credit card number which may then be used to determine the credit worthiness of the caller from a database check. The collection of input information for the system may be effected based upon local resident databases, such as a telemarketer's database, or through use of third party databases, such as credit card or credit worthiness databases, or possibly, a combination of both local and remote databases. Any form or content for a local or remote database may be utilized which is consistent with the goals and objects of the invention.

Beyond credit databases and identification databases, numerous other options may be utilized. A demographic database may be utilized to identify direct or predicted attributes of the customer. Specific input information regarding the customer, such as age, sex, income, profession, education level, family status, lifestyle, and/or interests, may be used as separate and discrete inputs, or may be effectively combined to provide a coded designator based upon demographics, socioeconomic analysis or otherwise to provide a coded designator. A third party database provider, such as a credit card issuer (e.g., Visa, MasterCard, American Express), may not wish to provide specific, raw data with respect to a user, such as where they would specifically identify a customer's income as may be known to the credit card issuer through the credit application. In such circumstances, processed data may be provided such as through the use of the coded designator, previously mentioned. In this way, the third party database may provide responsive, effective information for the upsell determination, but yet preserve in confidence the specific details known to it regarding the user which is a customer of both the upsell service and the credit card company. Yet another type of third party database may include subscription information, such as telephone services subscription information as maintained by telephone companies or other carriers. Such information may include the types of service, such as call waiting, three-way conferencing or the like.

Yet another possible input to the system includes inventory data. Such data serves to minimize or preclude the offering of goods or services to a potential customer which are not then available, or which will not be available in a timely manner. Such inventory information may be used in a positive manner, such as an input for possible offers of an upsell, or in a negative manner, such as where a potential upsell has been determined but is then deleted from the possible proffers based upon its undesirable inventory status.

Yet another class of database information may include third party databases relating to items believed to be possessed by or desired by the customer. For example, a possession database may indicate that the system user possesses a certain formal ware pattern, or has a certain number of place settings of a pattern. The status information regarding the possession and/or completeness of a set may be utilized as an input to the system to identify an upsell to the customer. In yet another aspect, a registry database which reflects desired goods or services may be consulted as yet further input information for the system for identifying the proffer.

The system for identifying the potential proffer utilizes the input information so as to generate one or more outputs comprising potential proffers to the user. Various selection methodologies are available, including historical selection criteria keying the proffer to what has effectively resulted in sales or successful transactions in the past, or proffers based upon demographic profile or other inputs as a designator for a potential upsell. In yet other selection methodologies, theme sales may be utilized such as where further goods are required to complete a set, such as a formal ware set.

In yet other aspects, the invention may include actions taken upon the historical factors relating to a specific customer or customer type. For example, the system may adapt to reduce the number or frequency of upsells if it is determined that the customer is unlikely to purchase, or a pattern or time basis to the customer's purchasing is detected or expected. Yet another historical factor may include a quality factor, such as where it has been determined or assumed that the customer is interested in a certain level of quality, and accordingly, the selection of the proffer is based in part upon the quality. In yet another aspect based upon historical factors for a specific customer, knowledge of a user's possession, such as based upon a prior purchase, may be utilized in the proffer. For example, where a computer sales entity possesses the knowledge that the customer owns a particular model of computer, that information may be utilized in the selection of a proffer, such as in the offer of increased computer memory, a new version of a software application or the like. Yet another historical factor may include obsolescence of possessed materials, such as through the passage of time whereby the possessed item becomes worn, outdated, or outgrown.

Yet other factors affecting the upsell may be based beyond those particular to the user. For example, proximity to key calendar events for others, birthdays, anniversaries or other typical gift giving days, may be utilized as a factor in the selection of the upsell. Further, the time of the contact may be utilized, such as where a user contacts the system during the nighttime, wherein an upsell more likely to sell to a 'night owl' will be offered as opposed to what is believed to effectively sell to a 'morning person'. Offers may vary based upon day of the week, or day of the month, such as correlation or actual or expected paydays.

In one aspect of the invention, multiple actions may be taken in one transaction. For example, while a credit verification is being effected for a primary transaction, a second credit check may be performed to determine available credit, which is in turn used as an input to the upsell determination system. In yet another aspect, multiple upsells may be selected, whereby multiple potential purchases are offered to the user either simultaneously or serially, and if serially, the reaction to an earlier offer may be utilized in the decision for subsequent offers.

After the upsells have been identified, they are offered to the user. In the telemarketing application, a script directed towards the sale of the selected product is provided to the telemarketing representative. In an electronic commerce environment, a display or other communication of the offer is made, such as through textual data, video, and/or audio communication. Additionally, information may be provided by additional or other modes of communication, such as e-mail, facsimile, independent phone contact, cable contact, etc. The proffer is typically accompanied by a solicitation to consummate the transaction. The results of the proffer response thereto may be utilized in the modification or updating of the system for identifying later upsells.

In one aspect of this invention, a method is provided for presentation of information to users of an electronic system comprising the steps of, first, establishing communication between a user of the system and the electronic system, second, determining characteristics of the user based at least in part upon the communication between the user of the system and the electronic system, third, determining the mode of presentation for the user based at least in part on the determined characteristics of the user, and fourth, presenting the information to the user in the determined mode.

In yet further aspects of the consummation of either or both of the primary transaction or the derivative, upsell transaction, an order fulfillment system may be utilized. Upon receipt of indication that the transaction is to be consummated, the system may so designate the product, and may automatically provide for shipping and billing of the user. Optionally, tracking of the item may be included.

In yet another aspect of this system, an electronic system permits the user of a web or other electronic commerce system to interact with a live operator. In this way, what has heretofore been merely communication between a user and a non-human system may divert the transaction to an operator/transaction assistant.

DETAILED DESCRIPTION OF THE INVENTION

Figure 1:
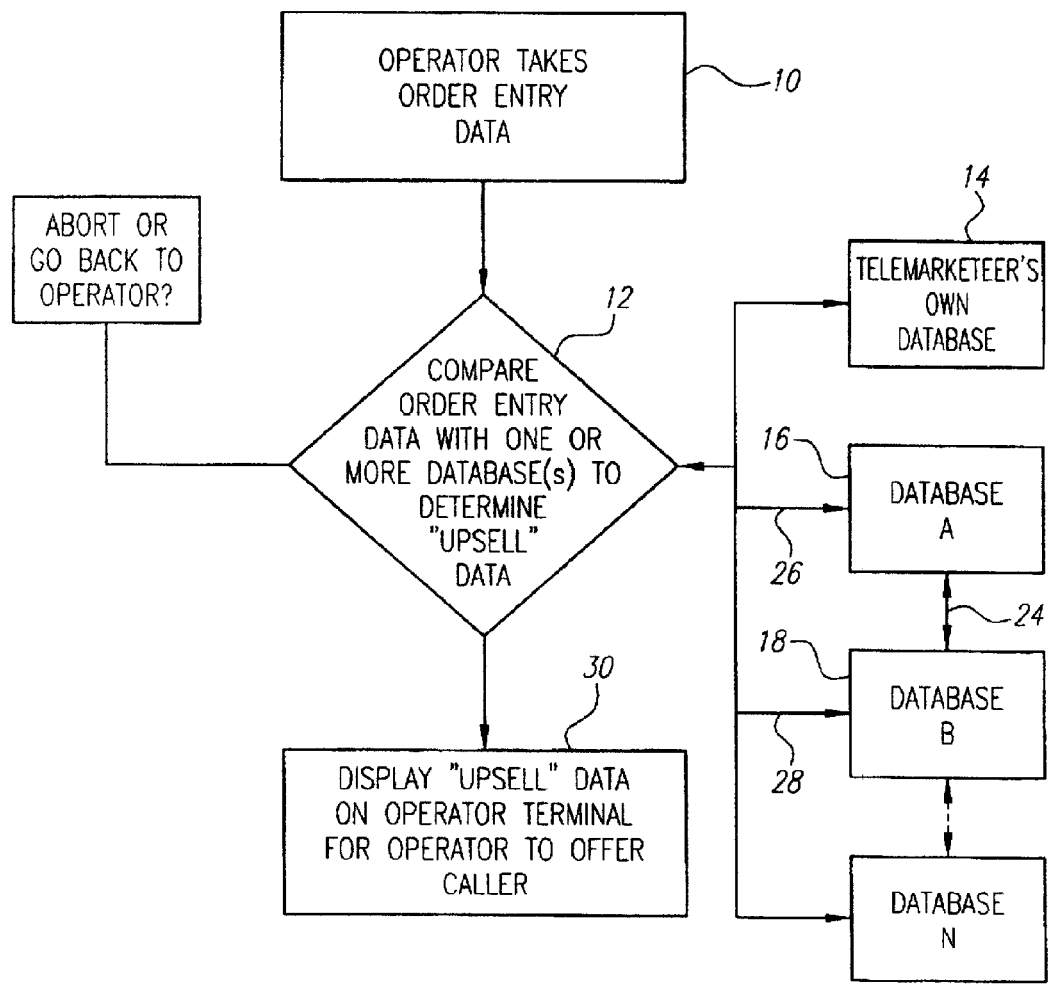
FIG. 1 is a simplified flowchart demonstrating aspects of the upsell system.

FIG. 1 shows a hybrid block diagram and flowchart of one implementation of the system and methods of these inventions. The simplified depiction of FIG. 1 reflects aspects of a telemarketing implementation, though it will be understood that various structures and functionalities may be extended to other implementations, such as electronic commerce and the like.

By way of terminology, when the terms "user", "system user", "customer", "potential customer", "contact" or equivalent terminology is used, those terms are meant to refer to a person or entity to whom the efforts of the offering are at least in part directed. Variations in meaning as to this terminology may be taken from context, as necessary. The terms "good(s)" and "service(s)" while distinct, are intended within the scope of the patent to be used interchangeably, where appropriate given the context. When appropriate from context, a good or service may include a coupon, ticket, card or other promotional material, including printed material, having a value designator. The term "upsell" means an offer or provision of a good or service which is selected for offer to the customer and differs from the good or service for which the primary contact was made. The term "upsell" is not limited to the context in which a primary transaction is intended to be a sales transaction, but additionally includes the offer of a good or service offered in accordance with the selection criteria of the invention even if the primary transaction is not principally sales motivated, such as where an initial contact is for service or repair purposes. The use of "he" is gender neutral, and may be read as "he", "she" or "it". When the term "and" or "or" is used, they may be read in the conjunctive or the disjunctive, where appropriate from context.

Initially, a system user contacts the system for purpose of a primary transaction. As explained, however, the transaction need not be a consummated transaction. If the system user is a potential customer contacting a telemarketing system, at action (statement) block 10 a telemarketing operator may interact with the potential customer and take the order entry data for the primary transaction. Either upon completion of the primary transaction, such as through consummation of a sale or by program flow to further action prior to consummation of a sale, action (decision) block 12 is arrived at wherein data, such as order data or other primary transaction data is compared to one or more databases for analysis. The primary transaction may be a contact for a sale or other commercial transaction, a service or repair transaction or interaction, or may be for the purpose of an inquiry.

As depicted, a first database 14 coacts with action block 12. Typically, the database 14 is a locally resident database, such as the telemarketers own database. It should be understood that a locally resident database refers to any database configured for any access by the telemarketer, not necessarily one that is located at the telemarketer's site. Database 14, if a resident database, may handle matters requiring relatively quicker response, such as correlating automatic number identification (ANI) information received over the telephone or communication network with other identification or prior transaction information on the caller.

One or more other databases (database A-database N), such as database A 16 and database B 18 may be coupled to action block 12. As depicted, database A 16 is coupled via coupling path 24 to database B 18. Additionally, coupling path 26 interconnects action block 12 and database A 16. Similarly, action block 12 is coupled to database B 18 via coupling path 28. Any of the databases 14, 16, 18 may be interconnected as desired consistent with the intended functionalities of the systems described herein. Thus, though not expressly shown, the resident database 14 may couple to database B 18, either directly or via a path such as through action block 12 to coupling path 28, or via action block 12, coupling path 26, database A 16 and coupling path 24. These databases may be accessed simultaneously, or in any combination of parallel, serial, sequential or time access. Preferably, the accessing of multiple databases is performed in a manner to minimize any delay in effecting a real-time proffer to the user.

Secured communications are preferably utilized within some or all of the system. For example, encrypted messages or data may be utilized, such as when transmitting raw or analyzed data from, to or between data bases. Further, privacy concerns are addressed by precluding or inhibiting the sharing of information between users, or between various database owners or content providers. Further, security qualification or entitlement restrictions may be utilized such as to the entire system, or parts of the system, such as databases.

Sources of input information for the system, such as primary transaction data and other input data for the upsell identifying system may come from any or all of action block 10, or other databases 14, 16 and 18. It will be understood by those skilled in the art that the number and interconnection of the various databases 14, 16 and 18 has been simplified for expository convenience, and is not intended to be a limitation on the scope or teaching of the invention. From action block 12, after the system identifies one or more upsell items for offering to the potential customer, offering block 30 serves to provide the selected items to the potential customer. In the telemarketing application, the telemarketer would at this stage have text or other information available to provide to the customer. Typically, a screen pop including a text directed towards the sale of the upsell item would appear, at which point, the telemarketing sales representative would verbally make the sales presentation to the caller.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein. By way of example, while routing of telephone calls and computer-based call handling have historically been relatively discrete, segregable functions, and further segregable based upon discrete equipment, the trend is towards integration and distribution of functionality more broadly within a system. Accordingly, the understanding of the inventions herein should be based upon the functionality, as implemented by selected structures, though not necessarily upon which particular unit of structure in which the functionality resides.

Figure 2:
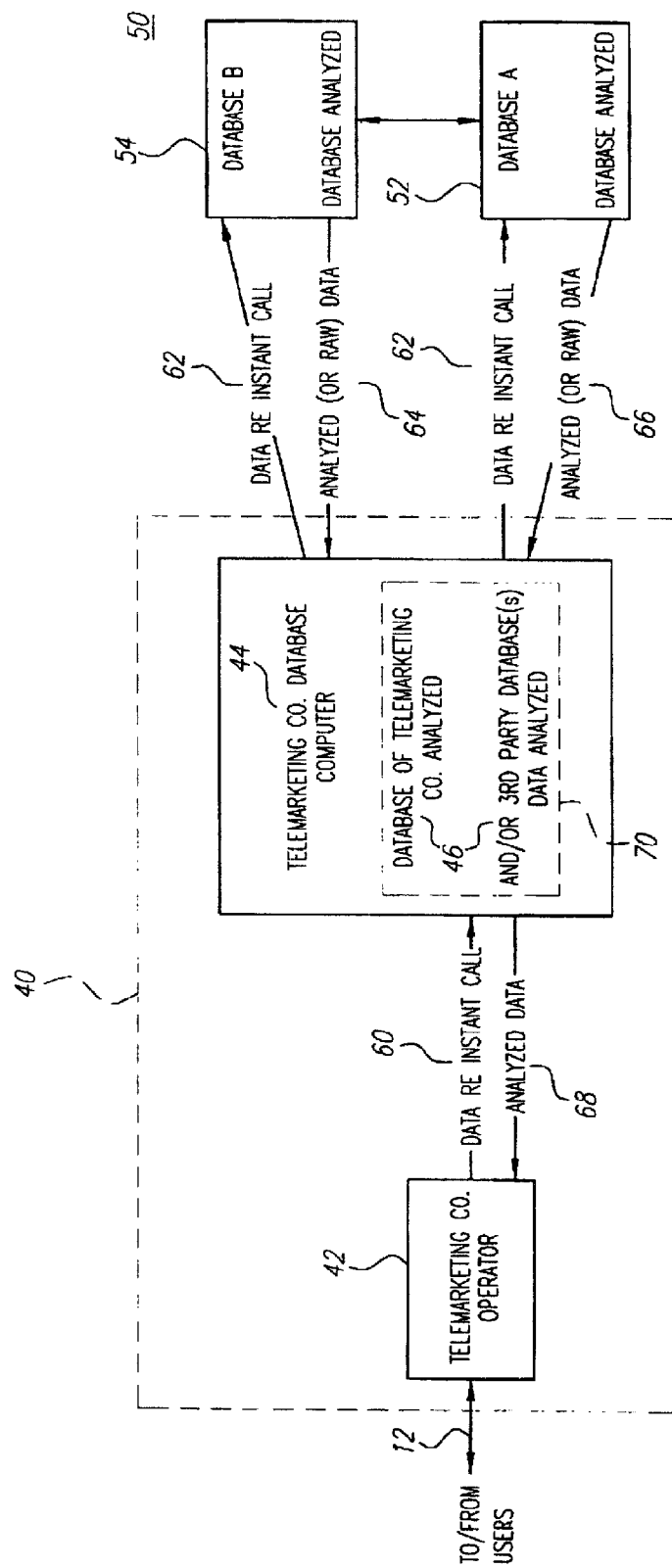
FIG. 2 is a block diagram of a system for implementing the methods of this upsell system.
Figure 3:
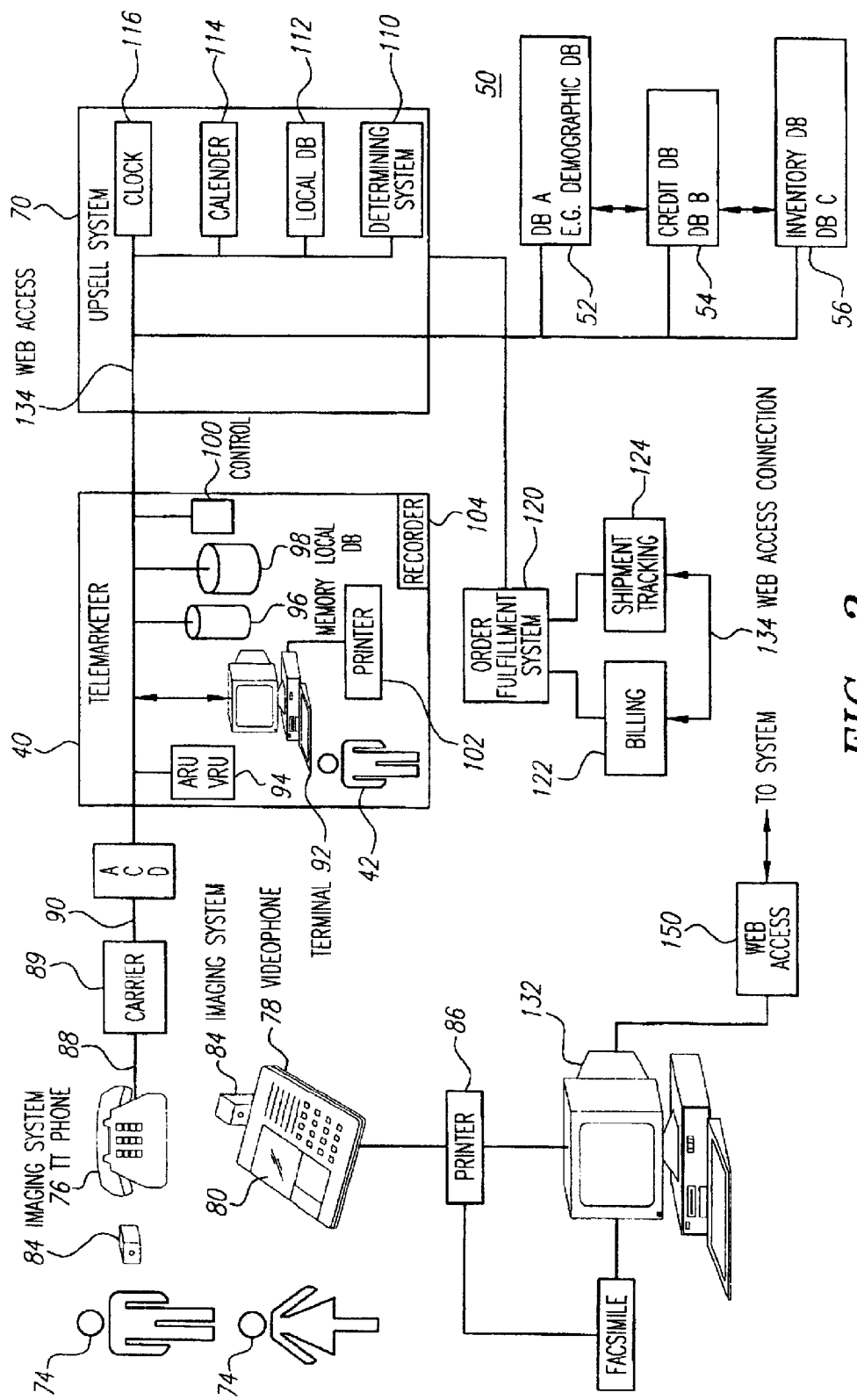
FIG. 3 is a flowchart for an Internet-based order transaction in accordance with the invention.

FIG. 2 is a block diagram of a simplified embodiment of structure usable to achieve the functionality of these inventions when suitably adapted for such use. FIG. 3 is a more detailed schematic diagram of one possible implementation of a structure for use in implementing the functionalities of the inventions here. When feasible, the same numbering will be used in various figures to describe any corresponding element.

FIG. 2 shows a block diagram of a telemarketing system 40 adapted for communication with one or more databases 50, as well as a database 42 which may be integral or resident within the telemarketing system 40. Within the telemarketing system 40 are grouped various functionalities, including the telemarketing company operator 42, the database 44 resident at the telemarketing system 40 with its attendant computer for processing and control, as well as a computer 46 for analysis of the inputs and generation of one or more outputs for provision to the user. One or more external databases 50 may be included within the system. A first database A 52 and a second database B 54 are depicted, though it is to be understood that the selection of two databases 50, and the interconnection therebetween, is selected for expository convenience and is not intended to reflect any limitation on the structure or functionality of the system, provided the functionalities of the invention may be achieved.

FIG. 3 shows a block diagram of one implementation of a telemarketing system at a greater level of detail as compared to FIG. 2. While the following description is generally provided in the context of inbound telemarketing, the inventions herein may also equally be applied to outbound telemarketing. Users 74 (also known as customers, or potential customers) access the telemarketing system 40 via any known manner of telephone, telephonic instrument or its equivalent. As shown, telephone 76 comprises a touch-tone phone having a handpiece including a speaker and receiver, as well as an array of alphanumeric buttons for actuation by the customer 74. Alternatively, video phone 78 provides for both audio communication as well as image or video communication. The video phone 78 includes an array of alphanumeric buttons, a video display 80, typically a handset, and some imaging system 82, comprising a camera or other image generating system. A conventional touch-tone phone 76 may be utilized in association with a separate imaging system 84, if desired. In yet other modes, the customer or user 74 may interact with any other form of man-machine interface which is consistent with the goals and functionalities of these inventions. By way of example, but not of limitation, the customer 74 may interact with a computer, whether stand alone or networked (by local area network (LAN), wide area network (WAN) or otherwise), which includes a communication capability (modem, etc.), or may comprise access capabilities to the Internet or web or internet television type systems. While the particular implementations and embodiments of the user 74 interface may vary, any interface which provides output to the customer 74 and permits return entry consistent with the functionalities to be achieved herein is acceptable. Optionally, other devices such as a printer 89 may be included. These various devices then interface with a carrier 89. The interconnection 88 between the end instruments 76, 78 may be of any mode or manner, such as a copper wire connection, cable connection, wireless connection, cellular connection, satellite connection, or any other mode or manner of connection. Similarly, the communication path 88, and carrier 89 may utilize any type or mixture of carrier technologies, whether analog, digital, ISDN, or at any rate of speed consistent with the achievement of the functionalities described herein. Preferably, the carrier 89 includes the ability for provision of more advanced telephony services, including the provision of DNIS, the dialed number identification service, and some form of caller identification such as automatic number identification (ANI, caller ID, etc.). Typically, the DNIS and ANI information are provided from the carrier 89 to the telemarketer 40 over connection 90, and may be either in-band or out of band signaling, such as bead-channel signaling in current time division multiplexed modes of operation.

FIG. 3 depicts the telemarketing system 40, and separately identifies the upsell system components 70. The upsell system components 70 may be optionally included broadly within the telemarketing system 40, or may be provided on a stand alone basis, such as where the upsell system 70 is geographically distinct from the telemarketing system 40, and indeed where the upsell system 70 may be resident at a third party location and be utilized by one or more telemarketing systems 40.

The telemarketing system 40 interacts with the carrier 89 via communication path 90. Optionally, this path may include various additional structures and functionalities as known to those skilled in the art. For example, automatic call distributors may be utilized at the front end of the telemarketing system 40 so as to serve a routing, holding and/or load leveling function, either done or in combination with other hardware and/or software. Within the telemarketing system 40, one or more operators 42, typically bearing headsets for audio communication, interface with terminals 92 which provide for at least textual display, and optionally, graphic image or video display. The operator 42 interfaces with the terminal 92 through any mode or mechanism, such as a keyboard, mouse or other pointing device, or any other man-machine interface for data entry or communication. Conventionally, the operator 42 is a live operator, though optionally the generation of audio images or video for presentation to the customer 74 may be synthesized or simulated or represent virtual reality. By way of example, a text-to-speech unit or other form of recorded speech may be utilized. An audio response unit 94, also termed an interactive voice response unit, may be utilized to provide some or all of the customer 74 interaction. Additional structures and functionalities required for the operation of the telemarketing system 40 may include local memory 96, local database 98, control (processor unit) 100 to provide overall coordination and control of the various components of the telemarketing system 40 and its interaction with the other units described. Additionally, a printer 102 may be provided for generating a hard copy record, such as of order transactions. Additionally, a recording unit 104, whether for audio, images, or both, may be included.

The upsell system 70 typically includes a determining or type analysis system or unit 110 which serves to receive the various inputs for the determining unit and to generate outputs relating to possible upsells for the customer 74. Optionally, a local database 112 is provided within the upsell system 70. Chronological information, such as provided from a calendar 114 and/or clock 116 may be utilized within the system. The databases 50, whether resident or external, are shown as database A 52, in this depiction being a demographics database, database B 54 being a credit database and database C being an inventory database.

Optionally, the system may include an order fulfillment system or unit 120 which is coupled to receive outputs from the telemarketing system 40 and/or the upsell system 70 indicative of a consummated transaction requiring fulfillment. Optionally, a billing unit 122 and shipping/tracking unit 124 may be utilized in conjunction with the order fulfillment system 120.

A simplified interconnection is provided in FIG. 2 and FIG. 3. The selection and arrangement of the interconnection, as well as its implementation, are matters which are known to those skilled in the art and depends upon the particular technology in which the system is implemented. Any interconnection or mode of implementation may be utilized which is consistent with the achieving of the goals and functionalities of these inventions. Yet other modes of accessing the system may be utilized. For example, electronic or web access 130 generically depicts access through communication networks, such as through Internet access, cable, television, direct broadcast, satellite broadcast, e-mail, facsimile, voicemail or otherwise. The web access 130 may connect via web access connection 134 to some or all of the various portions of the system, such as the shipping/tracking unit 124 so as to check on shipping or delivery information, the billing unit 122, or to directly access the upsell system 70 as a variation on the point of entry into the overall system. When considering access in a non-telephonic, though still electronic manner, reference should also be made to the descriptions of FIGS. 4 and 5 relating to Internet or web-based access and systems.

The depictions in FIG. 2 and FIG. 3 will be used now for a brief description of one mode of interaction of the customer 74 with the telemarketing system. A customer 74 may utilize a video phone 78 to dial a toll-free telephone number in response to observing a promotion for a good or service. The carrier 89 effects telephonic connection to the telemarketing system 40 preferably providing DNIS information which is utilized by the control unit 100 and local database 98 to provide a textual display on terminal 92 for use by the live operator 42 in interacting with the customer 74. Additionally, the carrier 89 may provide caller identification data, such as ANI data, which may be utilized by the control unit 100 to retrieve information from the database 98 particular to the customer 74. In addition to database 98, geographic designator programs exist which may be utilized to receive ANI data and to identify the geographic location of a customer such as by zip code, or more particularly, by zip code plus four. Based upon the retrieved information as provided to the live operator 42, a dialog is conducted relating to the primary transaction for which the customer 74 made the primary or initial contact with the system. While handling the primary transaction, the system may access one or more databases 50, such as a credit database 54 and a inventory database 56. If the user's credit card number has been obtained, such as during the primary transaction, or is otherwise known to the telemarketer through prior contacts or is devined via a correlation system, the credit card number may be utilized to obtain raw or analyzed data regarding the caller. The response from the credit card issuer or processor may be specific, such as providing data on the user's income, sex, history of purchase transactions or any other personal or demographic information known to it, or may provide a analyzed, coded message in response. The credit information, personal information, demographic information, possession information or other form of input data is then used by the system to generate the upsells or other real time provision of a secondary transaction. The secondary transaction may relate to the offer of a good or a service, or to a coupon, ticket, card or other promotional material having a variable or designated value for the purchase, lease or other acquisition in the future of a good or a service. In the preferred embodiment, there is a real time offer during a real time transaction. If the transaction is consummated, an indication may be provided to an order fulfillment unit 120 and attendant units such as the billing unit 122 and shipping/tracking unit 124.

Within the contemplation of the inventions, while a customer 74 is interacting with the operator 42 with respect to the primary transaction, the upsell system 70 is obtaining various input information for generation of a potential upsell item. As shown in FIG. 2, data regarding the instant call 60 may pass from the telemarketing system 40 to various databases 50, such as directly through path 62, or alternatively, from database A 52 to database B 54 via path 70. Database A 52 may provide in return analyzed or raw data 66, and similarly database B 54 may provide analyzed or raw data 64 to the analysis system 70 for processing in accordance with the inventions herein. Upon generating the potential upsells, that information is provided to the telemarketing system 40, for presentation to the operator 42 on the terminal 92. As described in more detail in connection with FIG. 8, multiple options may be presented for selection by the operator 42. If a transaction is then consummated with respect to the upsell, the order fulfillment unit 120 and associated units may be utilized as in connection with the primary transaction. As described further below, the data from the proffer of the upsell may then be utilized in subsequent transactions, such as by storing the information in memory 96, or by utilizing it in connection with the determining unit 110.

Reference has been made to the provision of analyzed or raw data 66 in connection with databases 52, 54. The following discussion applies generally with respect to the form of data provided. A database access may provide raw data, such as specific data relating to a given user, e.g., a particular user's income. A system may also provide analyzed or processed data, such as where not all of the data provided is raw data, but includes processed data, e.g., a coded designation indicative of certain aspects of the user. By way of example, third party database possessors often maintain substantial raw data specific to their customers. Financial institutions and transaction processors, such as banks, brokerages, credit card issuers, credit card processors, have extensive databases either from data provided to them such as through application, forms or which is known to them due to their continued course of contact. For example, a credit card company may both know specific raw data relating to a customer through the customer's indication of its income on the original application, but may also possess data relating to purchases (such as transaction frequency, amount, type, item and location) which are obtained in the course of processing the transactions of the user. The third party database owner may be unwilling or unable, e.g., due to legal restrictions, from providing the raw data to other parties for their use in telemarketing or electronic commerce applications. However, process data which does not specifically reveal information of the user may be provided. For example, a coded designator may be provided from the third party database to the transaction or upsell processor, typically through agreed upon codes and formats, whereby the required information is provided, but in a generic enough manner so as not to raise privacy or other concerns. For example, a designator code XYZ may relate to a user with an income over $50,000, expected net worth of $75,000, is a homeowner, and has an interest in stereo equipment. In this way, the specific confidential information of the user may be preserved, while providing effective input for the processing or upsell system. One or more coded designators may be provided. Coded designators may be provided at a finer level of granularity, such as one designator to indicate whether or not the user is a homeowner, has an income within a defined range, etc. In this way, multiple designation may provide a more complete description.

Figure 4:
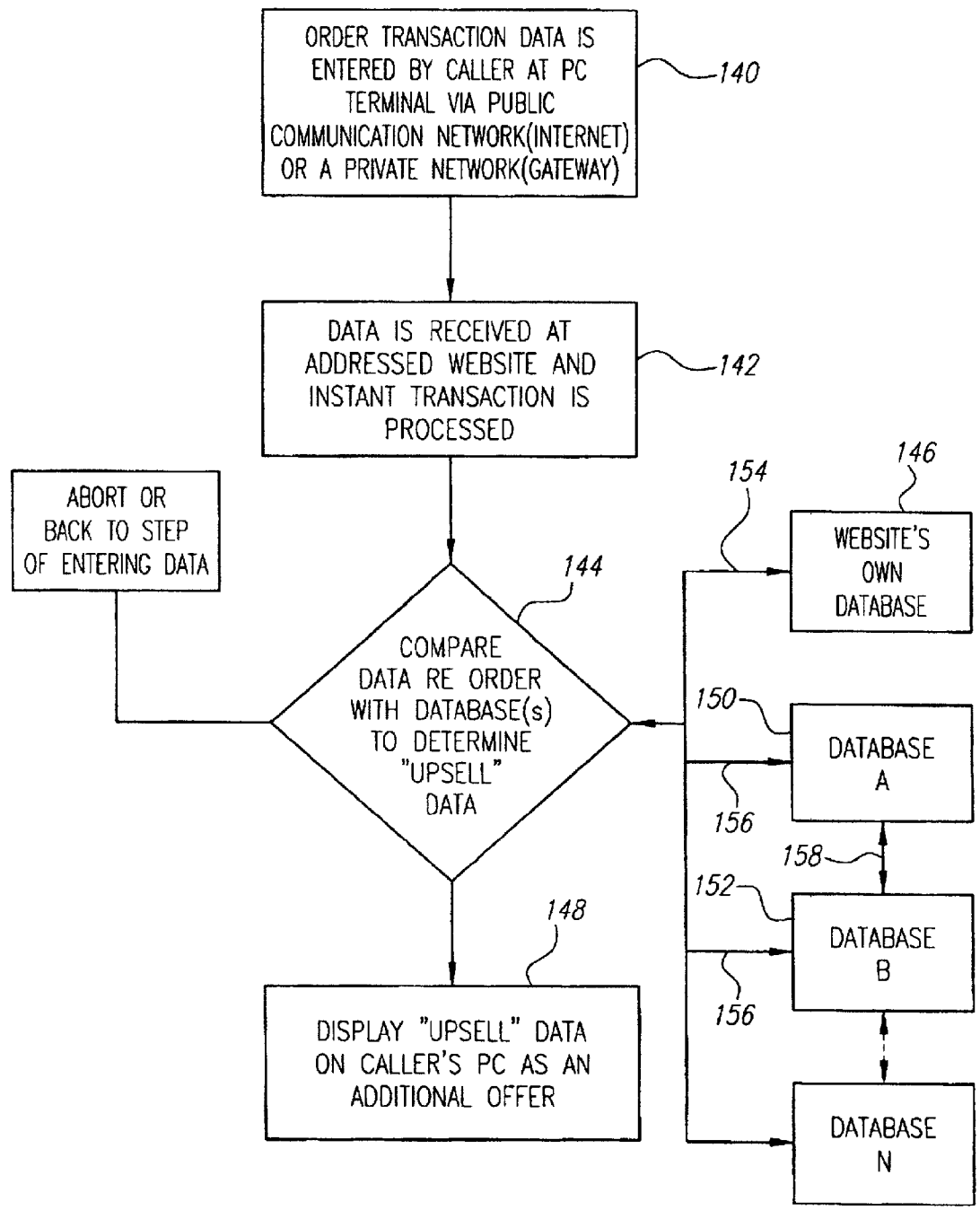
FIG. 4 is a block diagram of a system adapted for telemarketing applications.
Figure 5:
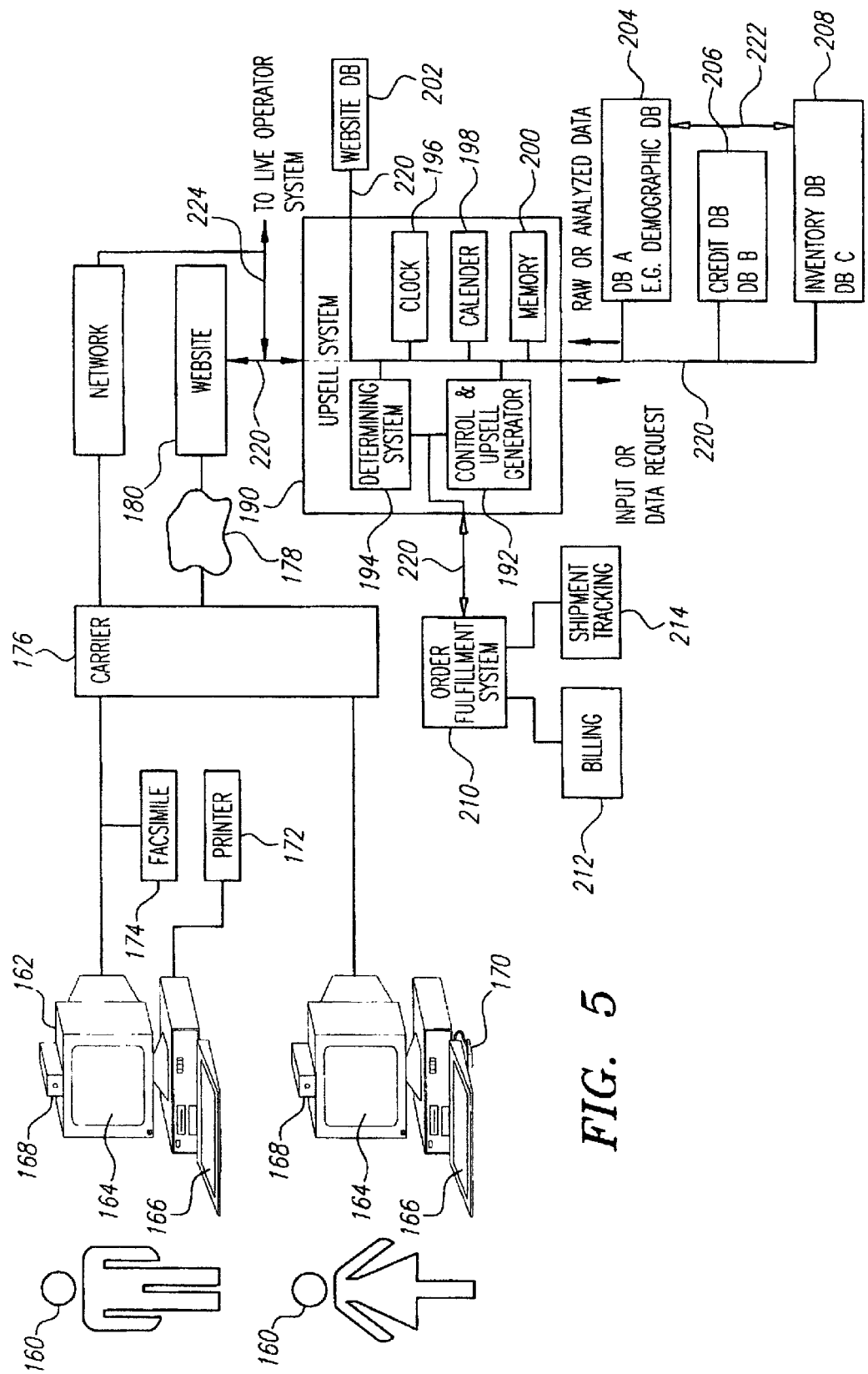
FIG. 5 is a block diagram of a system adapted for Internet or other electronic commerce use.

FIG. 4 shows a simplified flowchart and block diagram depicting an Internet, web-based or other electronic commerce system for performance of the inventions herein. FIG. 5 shows a detailed block diagram of one optional implementation of such a system. To the extent that description provided with respect to other figures described the same or similar structure or functionality, the description is incorporated herein by reference.

As shown in FIG. 4, a user interacts with the system via contact block 140 such as by having a primary transaction comprising an Internet order transaction being entered or effectuated by a user at a personal computer (PC) terminal. During the course of the primary transaction, processing step 142 serves to receive data at a address website and process the primary transaction. That transaction may be optionally consummated or not as suits the overall purpose of the transaction. By way of example, if the upsell serves to obviate the purpose for the primary transaction, such as when the primary transaction is for customer service or repair, and the upsell is successful in providing the customer with a new product in replacement thereof, then the primary transaction need not be consummated in the manner contemplated by the user at the point of initial contact 140. Continuing with the flow of the program, at analysis block 140, the various inputs for use by the analysis system are corrected, and subsequently analyzed. In the course of this collection and analysis, various sites, such as the websites own database, 144, remote database A 150 and/or remote database B 152 may be accessed. The coupling 154 between the analysis system 144 and the website database 146, as well as the couplings 156 to the external or other databases, 152, as well as any coupling 158 between the databases 146 (coupling to other databases not shown), 150, 152, may be implemented as known by those skilled in the art. The particular selection of interconnections between various components is left to selection of implementation, where the implementation merely needs to be consistent with the goals, objects and functionalities of this invention. Upon completion of the analysis at analysis block 144, the output of the analysis block 144 is provided to the user through action block 148. The upsell data may then be displayed on the caller's PC as an additional offer, or in lieu of the primary transaction.

FIG. 5 depicts one or more users 160 (also referred to as customers or potential customers) who interface with the system via a computer 162. Typically, the computer 162 includes a display 164, such as a CRT or flat panel display, some input device such as a keyboard 166, and optionally a mouse 170 or other pointing device, and may optionally include an imaging unit 168 to image the user 160. Additional devices such as a printer 172, such as to provide a permanent transaction record or to print images regarding proffered goods or services may be included. Similarly, a facsimile machine 174 may be included, and may be connected to a telephone system for effective communication. Again, any type of human/machine interface consistent with achieving the goals and functionalities of the instant inventions may be utilized with this system. A carrier 176, such as an on-line access service, cable access service, network, or other wired or wireless connection may be used to access the desired website 180. As depicted, connection path 178 is provided which serves as a generalized descriptor for a path, such as a Internet established routing, network routing, or other routing for connection of the user 160 for the website 180. The term website 180 is not intended to be a term of limitation, but rather of generic description, to be an intermediate or terminal node or contact point in the effecting of the electronic provision of goods or services so as to result in commerce or information transfer. While the website 180 may be a site on the Worldwide Web (WWW), it need not be so. The underlying aspects of this invention more broadly encompass the functionalities and structures to achieve them, as those particular implementations to achieve them are modified over time.

The upsell system 190 includes a control and upsell generator system 192, such as implemented through a special purpose computer or a general purpose computer program or otherwise adapted to achieve the functionalities described herein. The program may be implemented in a linear programmed fashion, or may use other decisional bases, such as expert systems, fuzzy logic, neural networks, adaptive systems, or other decisional systems known to the art, and which effectuate the desired functionalities of the inventions. Further, a determining unit 194 maybe included to provide an indication of the purpose of the original contact in the primary transaction. Clock 196 and calendar 198 provide date or chronology information, and may be combined as a single unit. Memory 200 may serve to store program information, input information to the control and upsell generator 192 or other data required for effective operation of the system. The website 180 may include its own database 202, either directly connected to the website 180 or to the upsell system 190. Various databases, including database A 204, e.g., a demographics database, database B 206, e.g., a credit database, and database C 208, e.g., an inventory database, may be accessed. Optionally, an order fulfillment unit 210, and associated billing units 212 and shipping/tracking unit 214 may be included as described in more detail with the telemarketing system. The interconnects 220 between the website 180 and the upsell system 190, and between the upsell system and various databases 202, 204, 206, 208, as well as the coupling from the upsell system 190 to the order fulfillment unit 210. Optionally, a connection 224 to a live operator system, such as the telemarketing system previously described, may be utilized. In this way, while an initial access for a primary transaction is provided to a website, through program flow (where the operator may initiate contact with the user) or at the election of the user (where the user may initiate contact with an operator) 160 may be placed in connection with an operator. Such an option provides for the ability to provide individualized interaction between the user 160 and the overall system for the provision of electronic commerce or information transfer.

Figure 6:
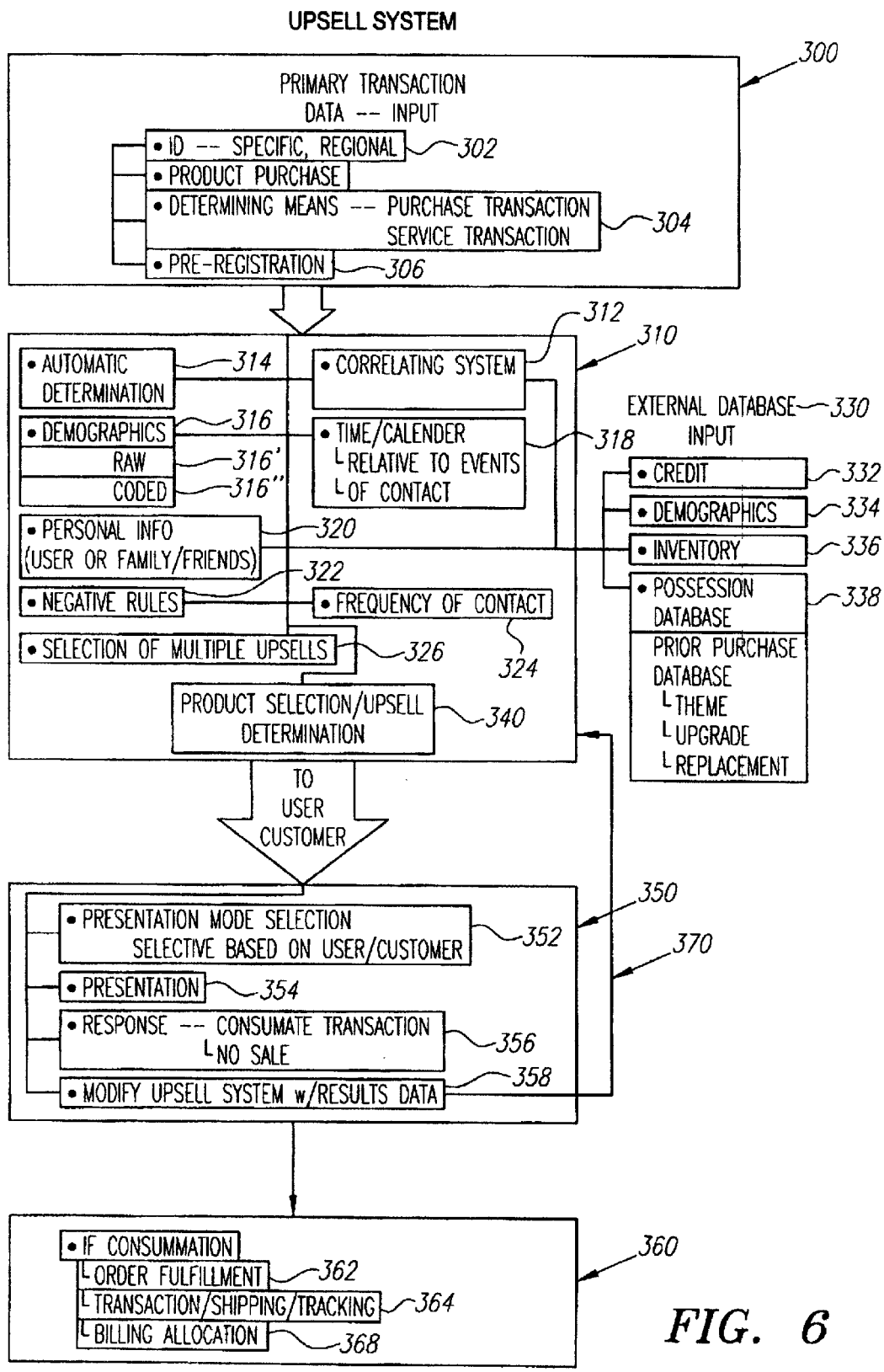
FIG. 6 is a block diagram of the functional aspects of the system.

The various steps in the typical operation of the overall system will now be described, with contemplation that the description may apply to telemarketing-based systems as well as electronic commerce-based systems, the applicability of the particulars to be taken from context. The description will relate to FIG. 6 which shows various interconnected functionalities, and will relate to other figures when noted. Broadly, the following discussion will relate to the primary transaction, both as to the data and completion or consummation of the primary transaction, second, to the upsell determination or other identification of specific proffers to the user, and finally the conveyance of that information to the user and the action or consummation taken after that provision of information to the user.

As to the primary transaction data 300, in a first aspect the primary transaction data may include a type of contact component 304. The type of contact may designate a purpose, particularly a primary purpose, for the original contact by the user. By way of example, a type of contact may be a purchase contact, or alternatively, may be a service contact. A system such as the determining unit 194 (FIG. 5) may generate the indication of the type of contact. The type of contact may be determined from the address information utilized by the user, such as where different telephone numbers are provided for sales as opposed to services, in which case the dialed number or DNIS information directly provides indication of type of contact. Alternatively, the selection may be designated by the customer, such as where a menu selection is provided, e.g., press 1 for sales, press 2 for service. The type of contact may also be in determinant, such as when the user has contacted a site without a specific purpose in mind. The type of contact may be defined at various levels of specificity, such as an indication that the type of contact was for purchasing generally, though without intent as to purchase of a specific item, to the presumption that the type of contact was specifically for purpose of a particular product.

A second aspect of the primary transaction data may include customer identification 302. Customer identification may be specific to a customer. Examples of specific customer identification would include a user's social security number, customer number, personal identification (PIN) number or other designator uniquely identifying the user. In the electronic realm, the customer identification may comprise an e-mail address, e.g., jasmith@aol.com, and Internet provider identification, or a source designator on a network. Various forms of electronic signatures may be provided which serve an identification, verification and authentication function. At a lesser level of specificity, namely, one at which a specific user may not be identified, various forms of identification exists. For example, a telephone number may provide geographic indication, such as through knowledge of its area code, or provide even more geographic specificity through the prefix. Other geographic descriptors, such as zip code or the finest level of geographic granularity (zip code plus 4) may be utilized. A residential customer number may not yet specify a particular customer within a household or location. Other forms of address, such as fax number, may be utilized to provide a local identification.

The user may be identified in yet other terms. For example, the user may be identified based upon the specific items being purchased, or more broadly, the type of item being purchased.

Further, the user may be identified by a quality factor, that is, some indication as to the perceived quality of the goods the purchaser may be interested in, such as based upon the initial contact. If the potential customer has contacted the system with respect to a high-end product, the system may classify the caller as one interested in high-end goods. Further, the timing of contact may be utilized to classify a caller. For example, a "night owl" who contacts the system after midnight to purchase computer products may be identified differently from a user who contacts the system at 6:30 in the morning.

As yet another aspect of identification, multiple individual items of identification may be combined or otherwise utilized in combination to provide yet further identification, confirmation or verification of identity.

While user identity may be obtained from the particular contact with the system, that identity, or further identifying data, may be entered during a preliminary or registration phase 306. In such a phase, additional information may be acquired. The data may be acquired in response to specific questions, or through an iterative or interactive approach.

Optionally, the forms of identification may be used in combination to provide higher level of specificity, such as to move from a local identification to a specific customer identification. One mode is to utilize further specific identification, such as initials, or to otherwise designate an identity. Alternatively, or in combination, once the suspected specific customer identification is arrived at, this may be confirmed with the user, e.g., by confirming "Is this John Smith?". Verification may be utilized, such as through provision of personal data, or through provision of an electronic signature or other secure and verifiable means of identification.

The identification may be obtained either automatically or in an non-automatic fashion. Automatic collection of identification may include the receipt of ANI information or electronic identification for electronic commerce or information provision. Non-automatic methods may include data entry, typically in response to prompts, such as through use of an interactive voice response unit.

The final aspect of the primary transaction is the completion or consummation of the primary transaction. In one implementation, the primary transaction may be completed, such as through consummation of a sale or completion of a service call or request. In yet other aspects, the primary transaction may be concluded, though not with the provision of the originally contemplated good or service. For example, in the context of a service contact, if the upsell is successful in providing the user with a replacement product, the primary transaction need not be completed. Optionally, at the caller's discretion, the primary transaction could be completed, such as where a caller does purchase a replacement product, but yet still wishes to obtain service on the product which form the basis for the original contact, and for the upsell.

After the primary transaction phase 300, the item selection phase 310 is entered. Within the overall contemplation of the system, it may be desirable to include a correlation unit 312 for matching one or more initial contact designators with yet another designator adapted for use in subsequent processing, such as database access. For example, when a caller's telephone number is obtained, and a specific identification arrived at, the correlation unit may provide the user's social security number for further access to databases in which that number provides a key or address. By way of example, third party databases may require specific forms of identification for accessing the databases, such as a combination of social security number and PIN number and that information may be provided from the correlation unit based upon the identification data obtained from the user. In this way, different outputs may be utilized for accessing third party databases, keyed to those databases, without requiring the user to excessively input identification information. Once the correlation unit has obtained unique, individual identification, it may provide the other forms of identification to yet further databases or other components in the system.

The identification of an upsell product or offer is divided into the aspects of identification and obtaining of inputs 300, the upsell determination 310, the output for subsequent offer 350 and, if applicable, order handling 360. As to the inputs for the upsell determination, they include the identification data 302, described previously. Further, demographic data 316 may be utilized relating to the user. The demographic data may be obtained from a database and be either raw data 316' or analyzed data 316". Data relating specifically to the customer 320 may include age, sex, income (either actual or estimated), profession or occupation, education level, family status, e.g., married, divorced, widowed, children, grandchildren, and specific data relating to them, lifestyle indicators, e.g., active outdoor, etc., address (specific address, city of residence, county of residence, state of residence, zip code, zip code plus 4), known interests, known subscriptions, known affiliations (e.g., service organization, alumni association, fraternal organizations, charitable organizations, etc.). In addition to specific information on users, the user may be associated with a code or designator which indicates others of a expected or suspected similar set of interests or reactions to an upsell. For example, the system may identify by code "422" those who are males in the 35-40 year old age bracket, with incomes in excess of $40,000 per year, with an interest in computers. That code may then be used as an input to the upsell selection system.

Credit data 332 may be checked in the course of the primary transaction, as well as in the course of generating inputs or processing for the upsell determination. In one aspect, the credit verification may take place in conjunction with a credit verification for the primary transaction. If the primary transaction is a purchase transaction, the credit verification may be obtained for the primary transaction, and then either obtain a specific credit authorization for an amount equal to the expected upsell, or obtain an indication of the amount of available credit remaining. If the amount of available credit remaining is provided, that will provide an indication of the preferably upper bound on the cost of the upsell offer.

Yet another form of database information includes inventory data 336. In determining the items for upsell, the inventory database may be consulted before, during, or after the upsell determination. The upsell may discount the offering of a product which is unavailable at that time. In another aspect, the system may yet still offer the product if it will become available in a timely manner. As yet a further aspect of inventory status, a delivery time window may be included, such that if the product cannot be obtained from inventory and delivered to the customer in a timely manner, that product is not offered as an upsell.

Third party possession 338 databases may be utilized. A manufacturer may maintain a database which maintains what it believes to be an accurate count of items possessed by the user, or an intended recipient of the sale or upsell. For example, a seller of china or formal dining services may maintain a database of the number of place settings of a particular pattern owned by a potential recipient of yet further settings or related goods. In this way, an input to the upsell determination unit may include the offer of specific items of merchandise which complete or compliment existing possessions.

Turning now to the upsell determination 340 or the selection of the product or service for offer, generally, the system comprises a multiple input, dynamic, preferably real-time system for the selection of a suggested product or service to offer to a potential customer or user. The process includes the identification or selection of a set or subset of all possible goods or services available for offer, with the goal of optimizing the likelihood of upsell, as well as achieving customer satisfaction.

In one aspect, the upsell determination system may utilize, in whole or in part, a system which bases the offer of an upsell based upon prior successful upsells. Thus, if a customer is categorized as being in class 422 who called a telemarketer to buy product X, and was successfully upsold product Y, if a later customer in class 422 contacts the system, the past success may be utilized as a factor in again offering the product Y to the caller.

Various historical factors relating to a specific customer, or to known classes of customers may be utilized. The selection criteria may include negative decision criteria, such as not trying to upsell a customer on an item that the system knows he has previously purchased, or has previously been offered but declined to purchase. The system may utilize prior purchases as a factor in determining the upsell for offer. Prior purchases may indicate areas of interest, suggesting the offer of further goods within that general area of interest. For example, a customer who has previously purchased clothing for use in mountain biking may be more susceptible to an offer for mountain bike related goods or services. In a similar vein, theme sales may be utilized. When it is known that the customer has previously purchased a portion of a set, the completion of the set may be a goal. Certain theme sales are based on periodic introduction of a new item, such as a yearly addition of a tree ornament or the like.

Other factors affecting the upsell may include inputs comprising areas of interest, such as based upon known subscriptions, prior contact of the user to other sites, such as other Internet sites may be utilized by the system to determine a user's possible interests, and therefore, their susceptibility to the upsell of particular goods or services. Yet another aspect of basing the upsell selection on prior purchases may include upgrades to prior purchases. For example, where the system determines that the user has previously purchased a computer of a given make and model, the system may offer as an upsell a good or service particularly adapted to improve the performance of the system of the user, such as provision of additional memory, or other modified component. Similarly, if a user is known to have a given version of software, the system may elect to offer a new version of the software. Obsolescence of prior purchases may be determined. This may be from the passage of time, updating of a product, or outgrowing of a prior purchase.

Yet other facts affecting an upsell may include relative considerations. For example, relative proximity to key calendared dates 318 for the user, or others associated with the user, may be incorporated. The relationship of traditional gift giving days to the date of contact may be utilized. Examples would include proximity to known birth dates, Christmas, Hanukkah, anniversaries, Valentines Day, etc. Further, family or relationship status may be utilized, such as offers of products for purchase for children, grandchildren, or others with whom there is a known established relationship.

The frequency of the upsell may be varied based upon expected receptiveness to the upsell at that time. Certain users may, through past particular experience with that user or through assumed desirability based upon studies of others, may determine the frequency with which upsells should be offered, whether to offer an upsell every time there is a contact, every other time, only in association with certain days or date (such as pay days), etc. The frequency may also be decreased if the user has manifested a lack of receptiveness to the offers in the past, or to a certain type or class of offer.

Multiple upsell items 326 may be utilized. In the telemarketing context, the telemarketer may have displayed to them multiple options, either for selection by the telemarketer, or for sequential presentation to the caller. In the electronic commerce context, multiple offers may be made such as on a screen, or provided sequentially to the caller.

Figure 8:
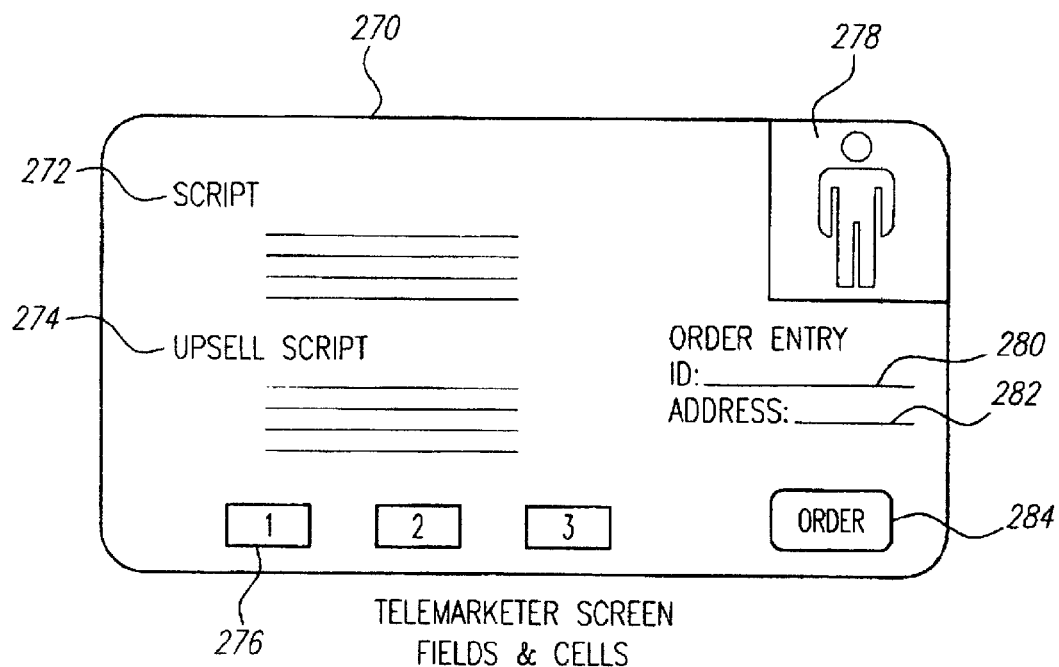
FIG. 8 shows a representative screen display for a telemarketing operator.

The third main component of the upsell consists of the actual offer 350 of the upsell to the user. In the event of a telemarketing upsell offer, the typical mode would include a display on the telemarketers screen of various script or product information 354, which is then provided to the caller. FIG. 8 shows a representative screen for a telemarketer display. The display 270 may include script 272 for use by the telemarketer for interaction with the caller. Specific upsell scripts 274 may be provided, either as a single option for the telemarketer, or to provide multiple options for selection by the telemarketer. Soft keys or icons 276 provide for selective identification of entry by the telemarketer. Various text or numeric based fields 280, 282 may be provided for entry of information, such as order entry, and specifically including identification data 280 and address data 282. This data may be initially provided automatically from the system, for possible confirmation by the telemarketer, or may be initially input by the telemarketer. Optionally, if image information is provided during the transaction, image 278 may be depicted on the display 270. By way of example, if a video phone system is utilized, the image of the caller may be displayed. Additionally, or alternatively, if image or video is provided from the telemarketer to the customer, those images may also appear on the telemarketer's screen 270 in region 278 to provide the telemarketer the same (though possibly in reduced size such as a picture-in-picture) which is simultaneously being provided to the customer. An order entry icon, tab or button bar 284 may be utilized.

The mode or manner of the offer 352 to the customer may also be varied. The customer's prior history or a determined optimum mode or manner of offer based upon customer designation may be utilized. Certain customers or customer designations may be best offered the upsell in a business-like, straight-forward manner, e.g., "We have a special offer for you today . . . ". Other potential customers who have manifested less than an eagerness to be upsold in the past may be initially addressed with a message of an apologetic tone, e.g., "I know you to not typically consider other times, but we have something that we think you will find worth your time to consider . . . ". Yet other presentations may be in a more elaborate or flowery manner, such as in the addition of music, other audio, images, video. The coded designators, or other data regarding the user, may be used in determining the mode or manner of the offer.

If the upsell is consummated 356, the order may be confirmed. That confirmation may be printed, if desired. Further, the customer may be provided with a confirmation number. If a shipping/tracking unit 364 is utilized, the tracking information, and the mode of accessing that system, may be provided to the customer. In the event the upsell offer is not consummated, the user may be offered an alternative upsell 358. The alternative upsell may be determined before the initial upsell, or may be recomputed, wherein one of the inputs to the determination system includes the negative result from the first upsell offer. Optionally, the customer may be queried regarding their reaction, either positive or negative, with respect to the initial upsell offer, so as to provide yet further specific inputs to the upsell determination system.

The system may be modified over time. For example, the success of prior upsells of specific items may be further incorporated in the decision as to the upsell offers 370. This modification of the rules over time may be either done in real time, or on a periodic basis, such as in a batch mode. Further, the system may receive data from users after the receipt and use of their obtained goods or services, such as wherein the customer satisfaction with the goods and services is then incorporated in the decision criteria for the upsell offer.

Figure 7:
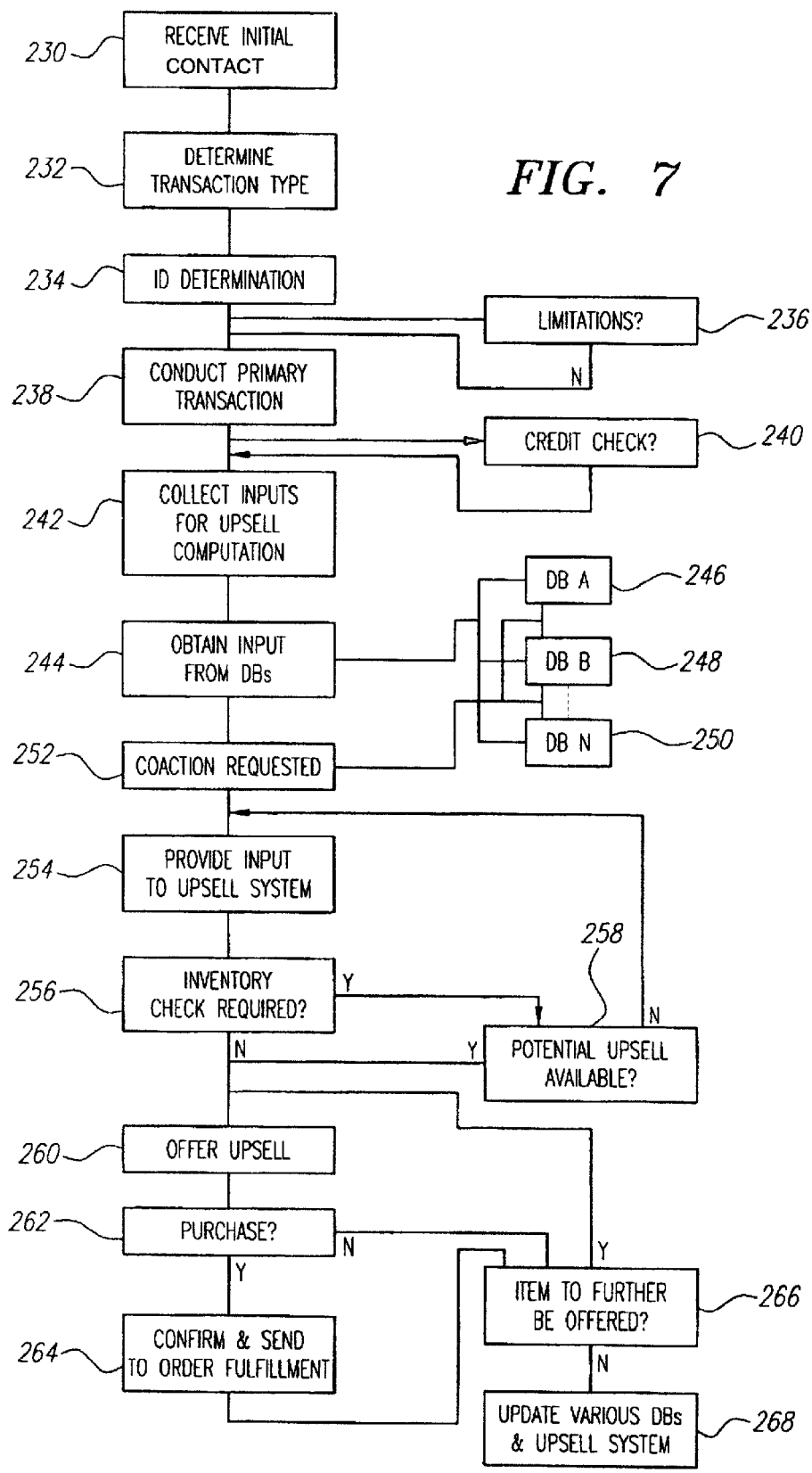
FIG. 7 is a detailed flowchart for one implementation of the methods of these inventions.

FIG. 7 shows a flowchart for one possible path through the system. Upon receiving an initial contact 230, the transaction type may be determined at step 232. Various identification determinations 234 may be collected and then used in determining whether any limitations 236 are to be applied, which if not, the transaction may then be conducted at step 238. Optionally, a credit check 240 may be performed, either for the primary transaction alone, or further, for a potential upsell. The inputs having been collected 242 from prior interaction, database checks 244 may contact and interact with database A 246, database B 248, ... database N 250, possibly under control when coaction 252 is required. The inputs having been collected are then provided 254 to the system. Optional inventory checks 256 may be performed and then utilized step 258 to determine if the potential upsell item is available. Once the upsell has been determined, the upsell may be offered in step 260, which if purchased at step 262 may then be confirmed and sent to order fulfillment step 264. Optionally, further items may be offered, step 266, in which case the upsell determination may be repeated, or the previously determined second upsell item offered. Typically at the end of the transaction, at step 268 the system will update various databases as appropriate and the upsell system, including the criteria for determining the upsell.

In the offering mode of the website, one variation may include the ability to transfer from the website to a live operator. Such a transfer may be useful wherein the potential customer is interested in obtaining further information regarding the offered product, or has queries which cannot easily be addressed in a web or electronic commerce context. As described in connection with the telemarketing screen, FIG. 8, the screen for the electronic commerce applications may include a display of the live operator, and may also include a display on the live operator console of the customer, if desired.

With regard to the billing system, in one aspect of this invention, it is possible to allocate billing 368 for use of the system. For example, if the primary transaction is financed by company A, and an upsell in the economic interest of company B is successfully effected, piggy-backing on the primary transaction of company A, an accord or allocation may be made between company B and company A regarding payment for the services. Typically, company B would make a contribution to company A, or in some manner reduce the cost for company A to conduct the primary transaction. Consistent with the allocation of expenses between two or more companies, it should be expressly noted that in the upsell system of this invention, the goods or services offered may come from independent sources. That is, the primary transaction may relate to a good or service from company A, and the upsell relate to a good or service from company B, where company A is unaffiliated with company B.

Figure 9:
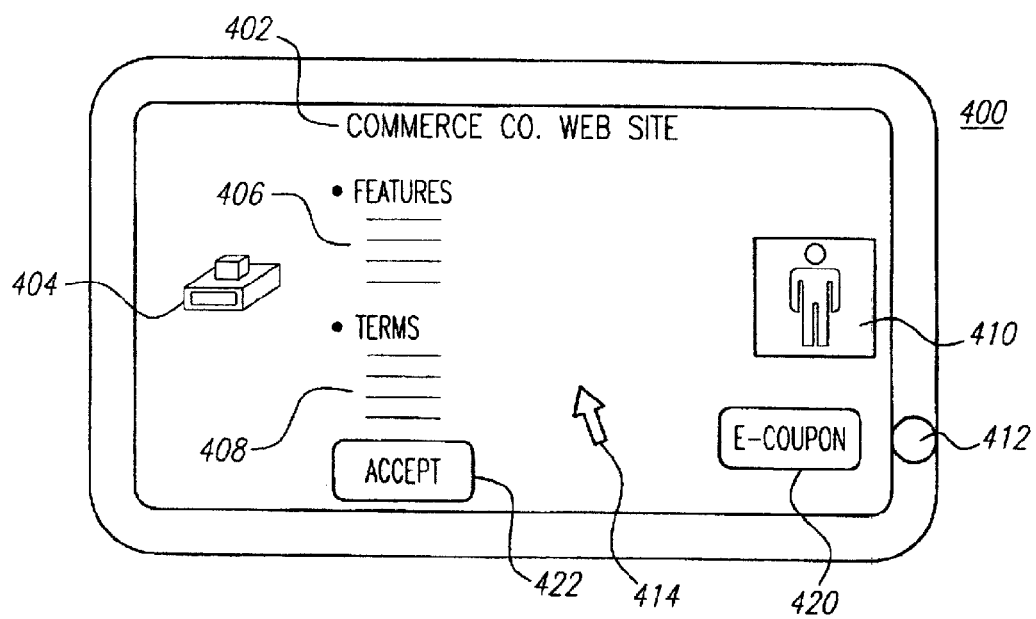
FIG. 9 shows an illustrative display for a Internet-based display.

FIG. 9 shows a depiction of a display such as used in one implementation of a electronic commerce application utilizing the inventions of this system. The overall display 400 may include textual information 402 identifying the affiliation of the provider of the good or service. A graphical depiction 404 of the good or service may be provided, which is either a still image or includes motion. Information regarding features 406 may be provided as well as may be the terms 408 of sale, lease or other interchange. Optionally, a display 410 provides a video feed such as from a telemarketing or other operator assisting the user, or provides a created image regarding a assistant for the transaction. Speakers 412 may be optionally utilized to provide audio information, either being one-way communication or two-way communication. Typically, some sort of a pointer 414 is displayed on screen 400 to designate the area of data for entry. For example, an acceptance 422 region may be clicked, or double clicked as required, to accept an offer. Optionally, an electronic coupon 420 or other form of coupon may be provided to the user in a real time manner for later use. The coupon may be for a discount on a later purchase, or may otherwise be a form of incentive to the customer, such as the award of credits which may be accumulated for exchange into other goods or services.

Figure 10:
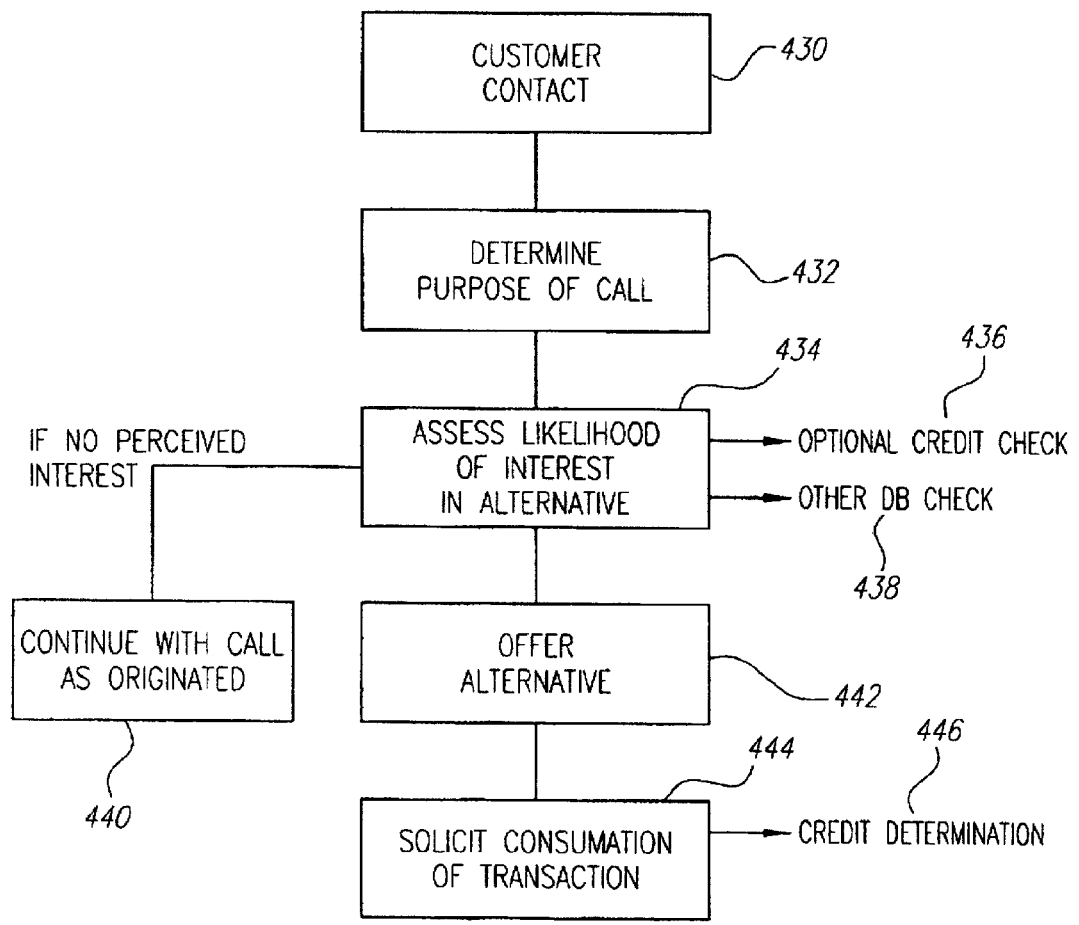
FIG. 10 shows a flowchart for a customer service application.

FIG. 10 shows a high level flowchart for a customer service operation. Upon customer contact 430, the purpose of the call 432 may be determined. The purpose may be determined such as from knowledge of DNIS as indicating a customer service number, or by response by the customer to queries, such as from a live operator or interactive voice response system (e.g., press 1 for purchase, press 2 for service ... ). Decision block 434 optionally provides a preliminary assessment of the likelihood of interest in an upsell or alternative presentation. In the event an offer is to be made, checks such as a credit check 436 or other database check 438 may be made. The input data is then provided to a processing, upsell system (as described previously) from which an alternative 442 may be generated and offered. The system may optionally then solicit consummation of the transaction 444, and may, if required, again access for credit determination 446. In the event that it is perceived at decision block 434 that no interest exists in an upsell, the system may continue with the call as originated 440. By way of example, assume that a user calls a service number regarding an integrated cellular phone and paging system. The system may obtain the ANI (or mobile identification number) and determine based upon the DNIS that a particular customer is calling a service number. After optionally confirming that the call relates to the repair of the phone/pager associated with the ANI or MIN, the system may determine that this product is sufficiently old that an upsell should be offered for a replacement item. By accessing a database, such as the cellular systems local database, it may be determined that the caller has a now supplanted model of phone, and possesses sufficient credit worthiness to purchase a new system. At that point, the system may offer the caller a purchase option for the replacement item, thereby effecting an upsell from one transaction type, namely, a service contact, into a separate type of transaction, such as a purchase transaction of a replacement or superior item. In this way, an upsell is effected.

3. Additional Embodiments

Figure 11:
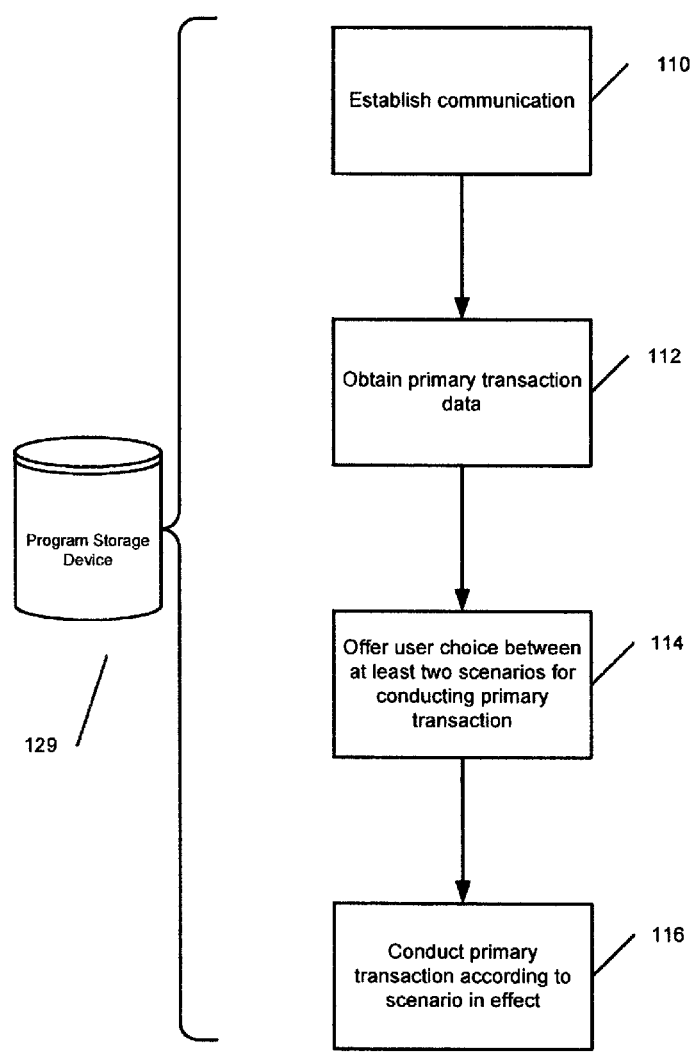
FIG. 11 is a flowchart of a process flow performed according to an alternative embodiment of the invention, wherein the user is given the opportunity to opt-in or opt-out of receiving offers of upsell transactions.

4. Other illustrative embodiments of the invention provide methods of offering a user a plurality of scenarios under which to conduct a primary transaction involving at least one specific item sought by the user. FIG. 11 is a flowchart of a process flow performed according to an alternative embodiment of the invention, wherein the user is given the opportunity to opt-in or opt-out of receiving offers of upsell transactions. The various blocks shown in FIG. 11 will be discussed below.

Figure 16:
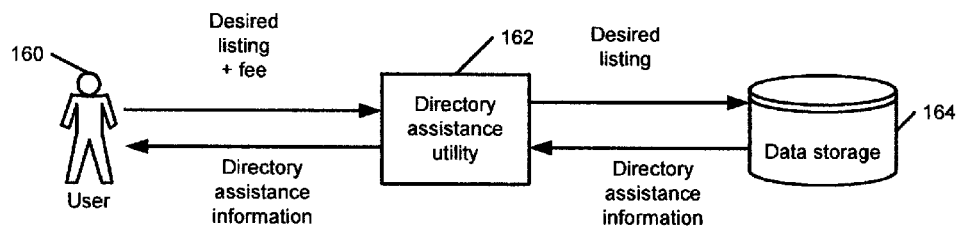
FIG. 16 is a block diagram illustrating the various entities involved when the invention is applied in the context of a directory assistance utility.
Figure 17:
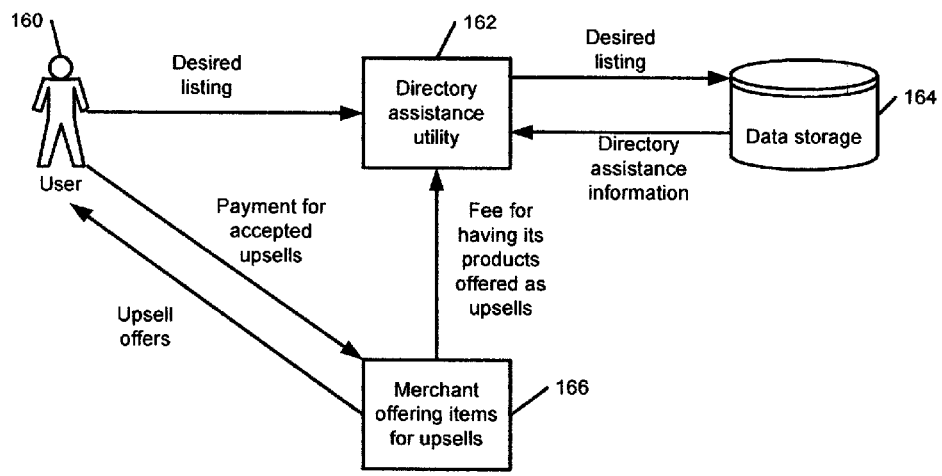
FIG. 17 is a block diagram illustrating additional entities involved according to other aspects of the application shown in FIG. 16.

As used here and elsewhere in this application, the term "specific item" as used herein may refer to any goods and/or any services sought by the user as the primary transaction. Of particular, but not exclusive, interest in this embodiment are situations wherein the user is seeking to conduct a primary transaction having an associated per-transaction cost. As a non-limiting example, FIGS. 16 and 17 illustrate situations wherein a user 160 dials a predefined telephone number dedicated to handling such requests. This embodiment of the invention may be applied where a telephone company or other telecommunications carrier provides this service, or where this service is outsourced to a third party, such as a private call center or teleservices operation. The entity providing this service is shown generally as directory assistance utility 162 in FIGS. 16 and 17, which utility responds to requests by the user 160 by obtaining directory listings from a data store 164.

Each of the scenarios provided by this embodiment of the invention may entail a corresponding cost to the user 160. Some scenarios might enable the user 160 to conduct the primary transaction free of charge or at a reduced charge to the user, in exchange for the user receiving offers for transactions as upsells to the primary transaction. Alternatively, the method can enable the user to receive a separate good and/or service at no fee or for a reduced fee in exchange for receiving one or more upsells. Other scenarios might enable the user 160 to conduct the primary transaction for a fee charged to the user 160, in exchange for the user receiving no upsell transactions.

Turning to FIG. 17, in the no-fee or reduced-fee scenarios herein, a merchant 166 providing the goods/services that are offered as upsell transactions may, but need not necessarily, "sponsor" the user's primary transaction. The term "sponsor" is used herein in the sense that the merchant 166 may agree to meet or underwrite some or all of the per-transaction or other costs associated with the user's primary transaction. Without such sponsorship, the user 160 would typically bear these per-transaction or other costs. In addition, numerous merchants 166 may participate as "sponsors", with each of them agreeing to meet at least part of these per-transaction costs or fees incurred by users 160 who choose the non-fee option, in exchange for having their goods/services offered as potential upsells to the users 160, or for having their goods/services being in the pool of potential items to be offered to users 160 as upsells. As discussed in detail above, the intelligent upsell determination process considers numerous factors in selecting the items to be offered as upsells to the user 160, and the selection algorithms discussed above can be extended to consider the participation or sponsorship of a given merchant 166, and offering items originating with that merchant as upsells accordingly. Specifically, goods/services offered by a given merchant 166 may receive "weight" according to that merchant's sponsorship of user primary transactions.

Returning briefly to the specific directory assistance example above, this aspect of the invention can include one or more merchants 166 agreeing to underwrite at least part of the fee charged by the entity 162 for providing directory assistance to the user 160 (the user's "primary transaction") in exchange for having the merchant's goods/services offered or considered for offer to the user as upsells. Additional aspects of this non-limiting example will be discussed below.

Figure 14:
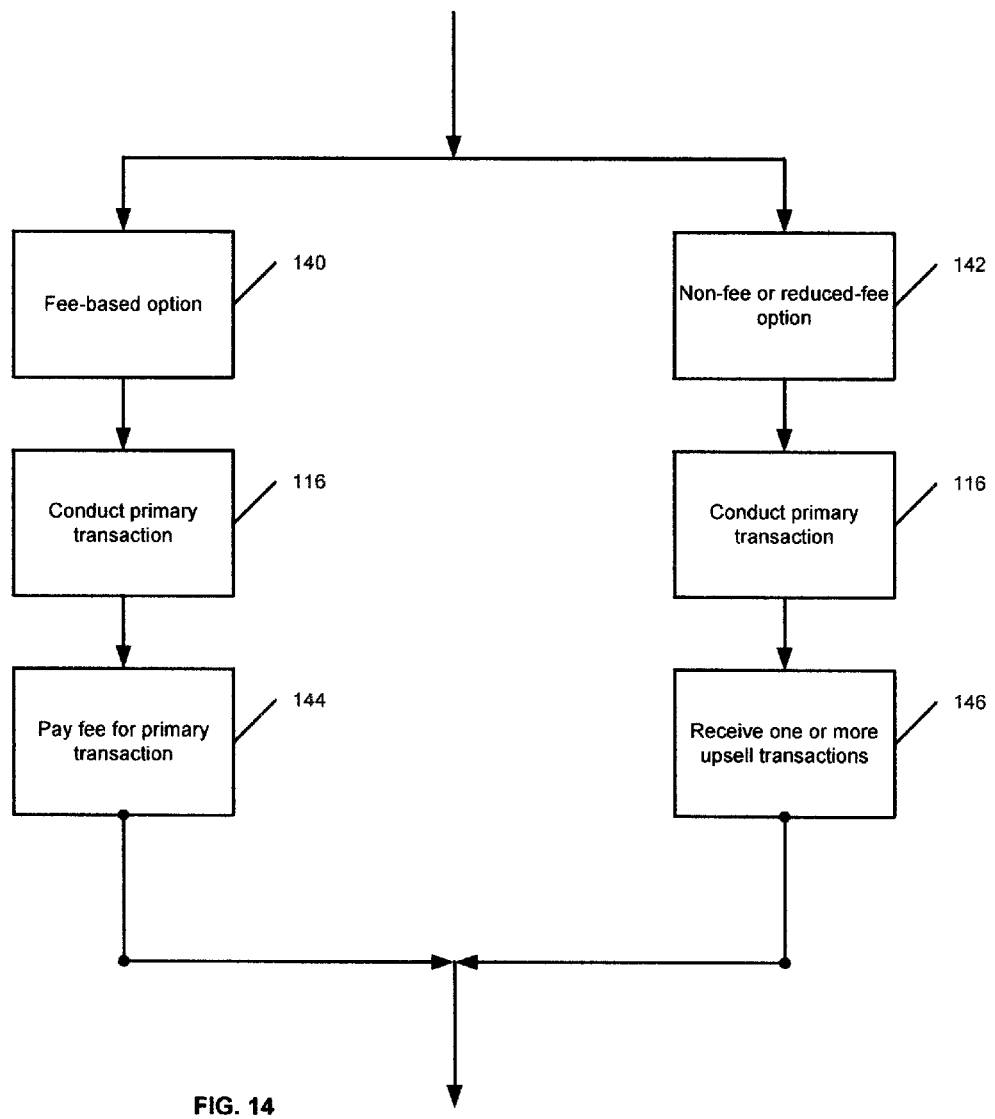
FIG. 14 is a flowchart illustrating in more detail the process flow shown in FIG. 11.

Returning to FIG. 11, at a high level, the method includes at least establishing communication via a communications device between the user and a system to facilitate conducting the primary transaction (block 110). The method obtains primary transaction data relating to the primary transaction, with the primary transaction data including data representing an identity of the user and representing the at least one specific item sought by the user as the primary transaction (block 112). The method offers the user a choice between at least two scenarios under which to conduct the primary transaction (block 114). Finally, the method conducts the scenario in effect (block 116). FIG. 14 illustrates these scenarios and related processing in more detail.

As shown in FIG. 14, a first scenario (blocks 142, 116, and 146) can enable the user to conduct the primary transaction free of charge or at a reduced charge to the user 160, in exchange for the user 160 receiving at least one offer of an upsell transaction. At least a second scenario (blocks 140, 116, and 144) can enable the user 160 to conduct the primary transaction for a fee charged to the user 160 (block 144), in exchange for the user 160 receiving no offers of upsell transactions. As discussed above, other scenarios may provide for reduced-fee—rather than no-fee—transactions, as well as scenarios wherein the costs or fees of the user's primary transaction are borne in full or in part by one or more sponsors such as merchant 166 in FIG. 17, who provide the goods/services offered to the user 160 as upsells. The method then conducts the at least one primary transaction according to the indication from the user (block 116). Those skilled in the art will understand that the order of discussion herein is for ease of presentation only, that that the order of processing performed by actual implementations of the method may vary from the above without departing from the scope of the invention.

Figure 12:
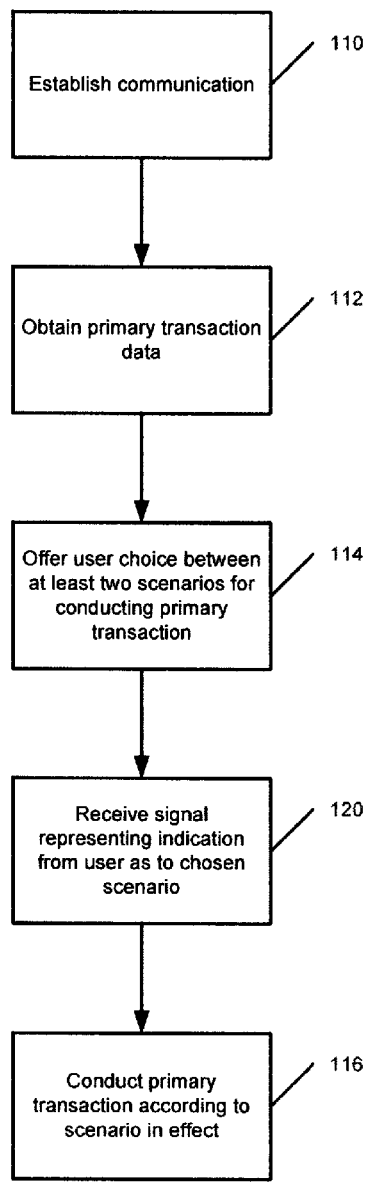
FIG. 12 is a flowchart illustrating additional aspects of the process flow shown in FIG. 11.
Figure 13:
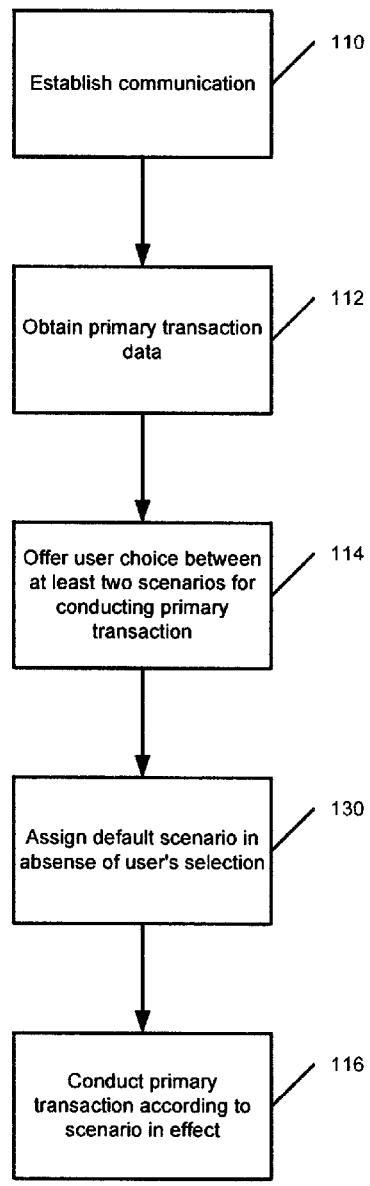
FIG. 13 is a flowchart illustrating additional aspects of the process flow shown in FIG. 11.

FIGS. 12 and 13 are flowcharts illustrating additional aspects of the process flow shown in FIG. 11, specifically illustrating instances wherein the user responds to the method affirmatively to choose a scenario, or fails to respond. As shown in Block 120 of FIG. 12, the method may receive a signal representing an indication from the user as to which of the above scenarios the user chooses to govern the primary transaction sought by the user. However, as shown in Block 130 of FIG. 13, if the method does not receive this signal from the user 160, the method may establish a default scenario under which to conduct the primary transaction, in the absence of any affirmative selection made by the user 160. The default scenario can be chosen from any of the scenarios discussed herein.

In certain embodiments of the above method, the primary transaction can be conducted in real time with respect to the receiving of the indication from the user, consistent with the definition of "real time" as provided elsewhere in the specification. However, the invention contemplates both real-time and non-real-time embodiments.

Continuing in more detail with the directory assistance example discussed in connection with FIGS. 16 and 17 above, this aspect of the method includes establishing communication with a directory assistance utility 162 from which the user 160 might request directory listing information or assistance. As noted above, various entities (represented collectively at Block 162) might provide or support this service, including telephone carriers or phone companies, as well as third-party call centers or teleservices providers. It is well known in the art to provide suitable telecommunications systems connecting the user 160 to such entities 162 and facilitating communications between the user 160 and such entities 162. These aspects of the method can also include obtaining from the user 160, as the primary transaction data, a directory entry for which the user 160 seeks information. Ultimately, the directory entry sought by the user may be forwarded as input to the upsell determination process. For example, if the user calls for the phone number of a given pizzeria, the upsell determination process may select a discount or coupon related to that pizzeria, or a franchise chain with which that establishment may be related. The entity 162 then fulfills the request by pulling the desired directory entry from data store 164, if such an entry is available.

Continuing with this illustrative embodiment of the invention, the method can include receiving a signal representing an indication of which scenarios the user had selected to receive directory assistance. The term "signal" as used herein refers to any hardware or software implemented signal capable of transmitting or representing the abstract choice made by the user 160. Typically, but not exclusively, the signal as referenced herein can be readily implemented using known analog or digital electrical technologies as a platform. Further, selecting and defining signal values corresponding to the scenarios selectable by the user as taught herein is well within the ordinary skill in the art. The signal, once selected and defined, can take a first value for a no-fee or reduced-fee scenario (block 142 in FIG. 14) selected by the user 160, in which the user 160 receives directory assistance free of charge in exchange for being offered at least one upsell transaction (block 146 in FIG. 14). The signal can take at least a second value for a fee-based scenario (block 140 in FIG. 14), in which the user elects to receive directory assistance for a fee in exchange for being offered no upsell transactions (block 144 in FIG. 14).

Regardless of the specific application in which the invention is implemented, the user 160 may opt-in or opt-out of upsells using a variety of means. If the user 160 is using a device equipped with a keypad, such as a telephone (whether wired or wireless) to access a communications network, the network may play a suitable script over the device that describes the various scenarios available to the user 160. This script can prompt the user 160 to choose a preferred scenario by enter data into the device, such as by punching a given key on the device. As well known in the art, the device converts such keystrokes into equivalent electrical signals and transmits them over the network, where these signals are processed intelligently to decode the abstract meaning assigned to those signals and keystrokes.

Another method includes prompting the user 160 to choose a scenario by voice command. In this embodiment, the network may receive a signal representing the voice command or response spoken by the user 160. The method can also include using a speech recognition engine analyzing a signal representing the voice command from the user 160. Suitable speech recognition technology is commercially available from a variety of vendors, including Nuance (www.nuance.com) and other vendors.

Figure 15:
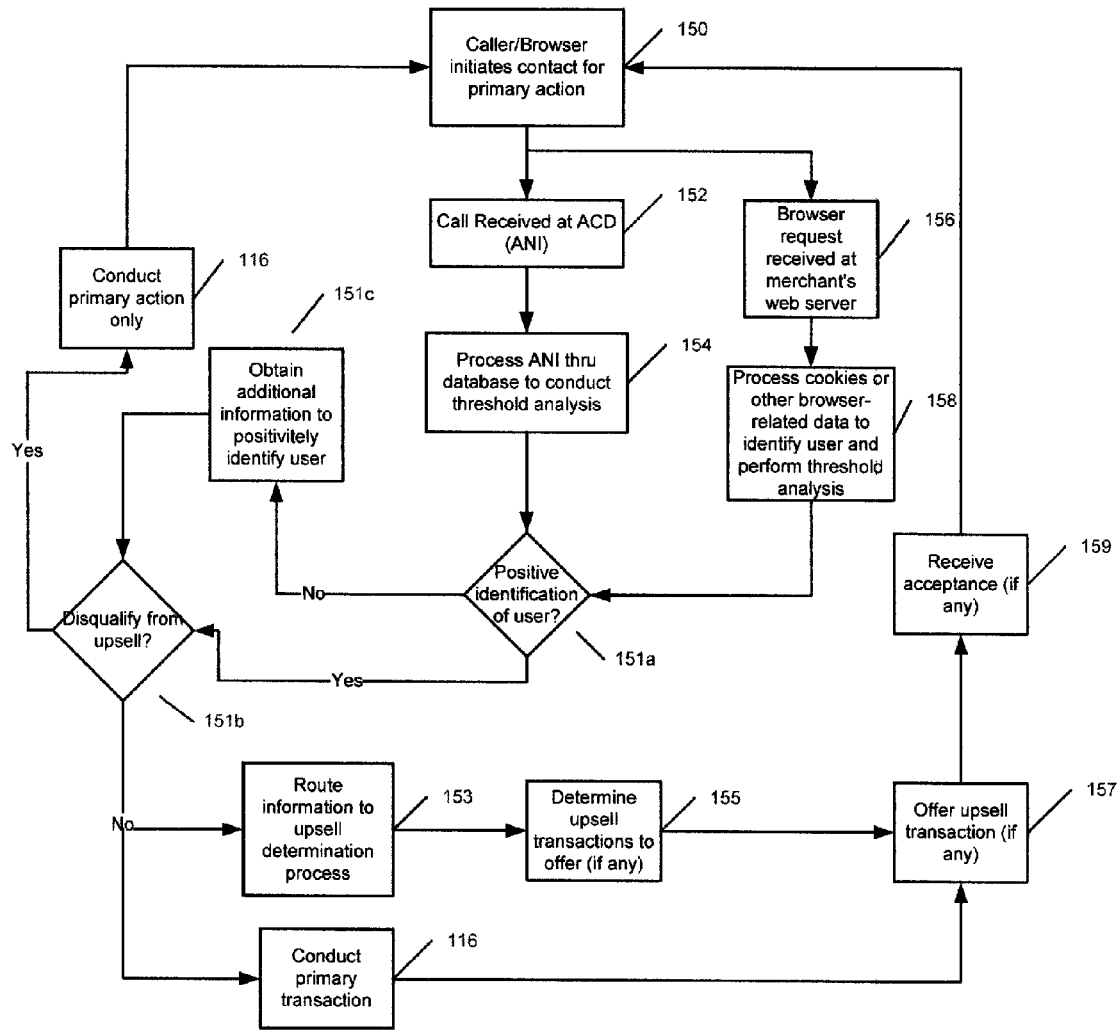
FIG. 15 is a flowchart illustrating at two-step process for determining whether to offer a given user upsell transactions.

Turning to FIG. 15, assuming that the user 160 opts-in to receive upsell offers in exchange for a no-charge or reduced-charge primary transaction, the method proceeds with the upsell processing as described in detail above. In summary of the above disclosure, the method obtains at least a second data element relating to the user 160 using the data representing the identity of the user 160, and analyzes the second data element and the data representing the specific item(s) sought in the primary transaction to determine whether to offer an upsell transaction to the user 160. If an upsell offer is appropriate under the circumstances, the method utilizes at least in part the primary transaction data (including the identity of the specific item) and the second data element to determine which item(s) to offer as a prospective upsell transaction to the user (block 155). The method can then offer the upsell transaction(s) to the user 160, and the user 160 can accept or decline the upsell as he/she sees fit. In various embodiments, the method can offer the one or more upsell transaction(s) (block 157), and if the user 160 so chooses, he/she may accept the upsell offers (block 159).

The user 160 may opt-in or opt-out of receiving upsell offers either on a per-transaction basis, or may establish a type of "universal" opt-in or opt-out that covers more than one transaction. On the per-transaction basis, the user 160 would opt-in or opt-out each on each separate occasion that the user 160 seeks to conduct respective primary transactions. In these cases, the method would include receiving a respective indication or signal from the user 160 (opt-in, opt-out, etc.) for each primary transaction sought by the user 160. On the "universal" basis, the method would include receiving an indication or signal from the user 160 (opt-in, opt-out, etc.) governing a plurality of primary transactions sought by the user 160. In this embodiment of the method, the universal opt-in/opt-out could extend into the future indefinitely, remain in effect until affirmatively overridden or countermanded by the user 160, or cover a definite number of discrete primary transactions before expiring.

Once the scope or duration of the user's opt-in/opt-out is defined as discussed above, the method in turn conducts a given primary transaction according to either a respective indication corresponding only to that given primary transaction, or an indication corresponding to more than one given primary transaction.

In some cases, it may be advisable to perform some type of pre-screening or preliminary analysis on the user 160 to determine the user's eligibility or desirability for receiving upsell transactions. FIG. 15 provides a flowchart of processing suitable for performing such pre-screening or preliminary analysis. This preliminary analysis can be performed either before proceeding with the primary transaction, before offering the user the opportunity to opt-in or opt-out of upsells, or at other times after the user has initiated contact with the network to commence the primary transaction. This initial contact (block 150) can take different forms, depending on various specific applications of the invention, and once the user makes initial contact, information obtained indirectly as part of this contact may form the basis for this preliminary analysis. Assuming a telephone-based implementation, the user might initiate contact by dialing a given telephone number, and once the user has done so, the telephone number associated with the handset from which the user is dialing can be obtained using known ANI technology (block 152), as discussed above. The user's identity can be wholly or at least partially derived given this information.

Assuming an internet-based implementation, the user might initiate contact by navigating to a merchant's website, or by pointing a web browser to such a site by entering a Uniform Resource Locator (URL) corresponding to the site (block 156). Once the user has accessed the merchant's site, the site may identify the user based on browser "cookies" stored either on the site or on the user's computer (block 158). Those skilled in the art will recognize that these examples are illustrative in nature, rather than limiting, and will appreciate that skilled artisans can readily apply the invention as described herein in other contexts by using teaching analogous to that provided herein.

The objectives of this preliminary analysis may be to identify those users who have been openly hostile to or impatient with receiving upsells in the past, or who otherwise are not good candidates for upsells, for reasons such as bad or no credit record, a history for being troublesome customers, or the like. These embodiments of the method can include conducting at least a first or preliminary analysis of the user to determine whether to offer the user any upsell transactions, typically but not exclusively by analyzing data representing at least the identity of the user and data representing past behavior of the user, shown collectively as blocks 154 and 158, for telephonic and web-based embodiments, respectively. In illustrative implementations of the method, the user's identity is used as an index or key to search a pre-existing data store containing data representing history or behavior of various users. If the user passes the first or preliminary analysis (block 151) based on these factors, the method can proceed to conduct ultimately a second upsell determination as set forth above.

As noted above, the method can perform this preliminary analysis (blocks 154 and 158) of the user 160 at various times with respect to other processing performed as part of the method. However, this analysis is typically not done until it becomes clear that a given user 160 is initiating contact to conduct his/her given primary transaction, whether by dialing a telephone, by borrowing to a website, or by other means. For example, the method can perform the analysis of the identity and of the past behavior of the user after the above has occurred, but before receiving any indication from the user 160 as to which opt-in/opt-out scenario he/she prefers. In other aspects of the invention, the method can conduct this first analysis after the user 160 initiates contact, but before the user 160 acts affirmatively to provide any information to the system, whether by physical or manual action to provide information to the system (entry or keystroke made onto keypad), or by verbal action (speech/voice command or response). More specifically, the method can include conducting the first or preliminary analysis before the user 160 enters any data via a manually-operated data entry device associated with the communication network.

In other embodiments of the invention, the method can include performing the first analysis (blocks 154 and 158) at least in part after the user has performed some physical action (voice input, manual data entry, or the like) to provide information to the system. For example, the user's ANI information (block 152) obtained from the telephone network or the data obtained from the user's browser (block 156), as discussed above, may partially, but not conclusively, identify the user who is attempting to conduct a given primary transaction. The method makes this determination in block 151*a*. A conclusive identification ("YES" output from block 151*a*) of the user may be necessary to perform the initial analysis with confidence. However, the method can make a partial identification conclusive by capturing and analyzing additional data from the user after the initial contact by the user (block 151*c*). Such additional data may include the user's voice and/or secure passwords/PINs associated with the user. By capturing and analyzing this additional data from the user, combined with the ANI or browser-related data captured and analyzed previously, the method can conclusively identify the user with confidence. The method can then proceed to obtain the data representing the past behavior of the user using at least in part the additional data, as well as performing any further processing related to the upsell determination(s) (blocks 151*b*, 116, 153, 155, 157, 159).

The invention as described herein may also be applied to the context in which a user 160 subscribes to an Internet Service Provider (ISP) to access or establish communications using a global communications network, or to a wireless telephone services provider to access or establish communications using a wireless communications network. In these embodiments, obtaining primary transaction information includes obtaining data from the user 160 that enables the user 160 to log into a global wide area computer network, or to communicate over the wireless network. Also in these embodiments, the user 160 can select a scenario using whatever device is appropriate for the given network, and receiving a signal corresponding to the user's selection would include receiving a signal that is transmitted over the given network. Those skilled in the art will appreciate that the above teaching directed to the directory assistance and other embodiments is equally applicable to the ISP or wireless telephone options discussed here.

Other embodiments of the invention extend the method to supporting general functions routinely performed using the public switched telephone network (PSTN). In these embodiments, the method includes the user 160 establishing communication by initiating a telephone call using the PSTN, and the primary transaction information obtained by the method can include at least in part an ANI or a Dialed Number Identification Service (DNIS) parameter associated with the telephone call placed by the user 160 using the PSTN. The user 160 can be offered an opportunity to place his or her telephone call for no charge or a reduced charge, in exchange for the user 160 receiving one or more offers of an upsell transaction. Alternatively, the user 160 can be offered the opportunity to place a telephone call for a fee charged to the user 160, in exchange for the user 160 receiving no offers of upsell transactions. Various aspects of this method can include enabling the user 160 to place local or long-distance telephone calls under the above scenarios.

Still other embodiments of the invention extend the above method to pay-per-view events transmitted over a communications medium to users 160. As used in this description, the term "pay-per-view event" refers to an event for which the entity transmitting signals depicting the event charges a fee to users 160 who wish to receive these signals to view the event. Typical but non-limiting examples of these events include concerts, sporting events, or similar types of performances. In these embodiments, the user 160 establishes communication by initiating an order or request to view the pay-per-view event transmitted over a communications medium. Typical but non-limiting examples of suitable media for communicating or transmitting these events include broadcast television, cable or broadband television, satellite television, or the like. The primary transaction information obtained for these embodiments includes at least data representing the identity of the user 160 and the pay-per-view event desired by the user to be transmitted over a communications medium. This data is then fed into the upsell determination process to identify appropriate upsells to offer the user 160, should the user 160 opt-in to receive upsell transactions. The method can offer the user 160 the opportunity to view the pay-per-view event for a reduced fee, or possibly no fee at all, in exchange for the user 160 receiving at least one upsell transaction offer. Alternatively, the method can offer the user 160 the opportunity to view the pay-per-view event transmitted over a communications medium for a fee charged to the user 160 in exchange for the user 160 receiving no offers of upsell transactions.

Turning to FIG. 15, assuming the user opts-in to receive upsells, the method can include routing the inputs to the upsell determination process (block 153), determining which upsell transaction to offer the user 160, if any (block 155), offering zero, one, or more upsell transactions (block 157) to the user 160 according to the scenario selected by the user 160. The method can offer the upsell transaction(s) to the user 160 via the same communications device used by the user 160 to conduct the primary transaction, but the method also includes sending the upsell transaction(s) to the user 160 via a communications medium different from that used by the user 160 to conduct the primary transaction. As an illustrative but non-limiting example, if the user 160 conducts the primary transaction using a telephone, the upsell transaction might be sent by e-mail via the user's ISP, and vice versa.

The invention also provides a program storage device 129 (see FIG. 11) readable by a computer or other machine, embodying a program of instructions executable by the machine to perform the various aspects of the method as discussed and claimed herein, and as illustrated in the Figures, for performing the various functional aspects of the method as set forth herein. Generally speaking, the program storage device 129 can be implemented using any technology based upon materials having specific magnetic, optical, or semiconductor properties that render them suitable for storing computer data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 129 can be affixed permanently or removably to a bay, socket, connector, or other hardware provided by the cabinet, motherboard, or other component of a given computer system.

For the purpose of conciseness, and in the interest of avoiding undue duplication of elements in the drawings, only FIG. 11 shows the program storage device 129. However, those skilled in the art will recognize that an application program stored on program storage device 129 could implement all functionality illustrated in any of the drawings or discussed in the description.

Those skilled in the art will also understand that a computer programmed in accordance with the above teaching using known programming languages provides means for realizing the various functions, methods, and processes as described and claimed herein and as illustrated in the drawing figures attached hereto. This application program can implement the various aspects of the method discussed above and shown in the drawing figures, and can be coded using any suitable programming or scripting language. However, it is to be understood that the invention as described herein is not dependent on any particular operating system, environment, or programming language. Example operating systems include without limitation LINUX, UNIX, or any of the Windows™-family of operating systems, and example languages include without limitation a variety of structured and object-oriented languages such as C, C++, Visual Basic, Java, Perl, or the like.

The foregoing cited references, patents and publications are hereby incorporated herein by reference, as if fully set forth herein. Although the foregoing invention has been described in some detail by way of illustration and example for purposes of clarity and understanding, those of ordinary skill in the art will recognize that in light of the teachings herein, certain changes and modifications may be made thereto without departing from the spirit or scope of the invention, which is defined by the appended claims.

What is claimed is:

1. A method, comprising:
  receiving primary transaction data relating to a primary transaction into an upsell determination unit, the primary transaction data including data representing a user and at least one specific item;
  generating, in the upsell determination unit, at least two scenarios under which to conduct a primary transaction and offering the user a choice between the at least two scenarios under which to conduct the primary transaction, wherein a first scenario provides that the user may conduct the primary transaction at a first cost to the user in exchange for the user receiving at least one offer of an upsell transaction, and wherein at least a second scenario provides that the user may conduct the primary transaction at a second cost to the user in exchange for receiving no offers of upsell transactions;
  conducting the at least one primary transaction, wherein the at least one primary transaction is within a definite number of permitted discrete primary transactions as defined by the user; and
  generating, in the upsell determination unit, an offer of the upsell transaction based on the primary transaction.

2. The method of claim 1, further comprising offering the upsell transaction to the user in real time during the course of the primary transaction.

3. The method of claim 1, further comprising receiving an acceptance of the offer of the upsell transaction.

4. The method of claim 1, further comprising receiving a signal representing an indication from the user as to which of the scenarios the user chooses.

5. The method of claim 1, further comprising establishing a default choice governing the primary transaction should the user fail to select from among the first and second scenarios.

6. The method of claim 1, wherein establishing communication includes establishing communication with a directory assistance utility.

7. The method of claim 1, wherein offering the user a choice includes offering a choice between a no-fee scenario for conducting the primary transaction and a fee-based scenario for conducting the primary transaction.

8. The method of claim 1, wherein offering the user a choice includes offering the user a no-fee option for conducting the primary transaction in exchange for the user receiving the at least one offer of an upsell transaction.

9. The method of claim 1, wherein obtaining primary transaction data includes obtaining from the user a directory entry for which the user indicates information.

10. The method of claim 1, wherein the offer of the upsell transaction is based on the primary transaction by utilizing the data representing the user to obtain at least a second data element relating to the user.

11. The method of claim 1, wherein the offer of the upsell transaction is based on the primary transaction by utilizing at least in part the primary transaction data including an identity of the good or service of the primary transaction and the second data element to determine at least one upsell item to offer as an upsell transaction to the user.

12. A non-transitory program storage device readable by a machine, tangibly embodying a program of instructions executable by the machine to perform:
  obtaining primary transaction data relating to a primary transaction, the primary transaction data including data representing a user and at least one specific item;
  offering the user a choice between at least two scenarios under which to conduct the primary transaction, wherein a first scenario provides that the user may conduct the primary transaction at a first cost to the user in exchange for the user receiving at least one offer of an upsell transaction, and wherein at least a second scenario provides that the user may conduct the primary transaction at a second cost to the user in exchange for receiving no offers of upsell transactions;
  conducting the at least one primary transaction, wherein the at least one primary transaction is within a definite number of permitted discrete primary transactions as defined by the user; and
  generating an offer of the upsell transaction based on the primary transaction.

13. The non-transitory program storage device of claim 12, further comprising offering the upsell transaction to the user in real time during the course of the primary transaction.

14. The non-transitory program storage device of claim 12, further comprising receiving an acceptance of the offer of the upsell transaction.

15. The non-transitory program storage device of claim 12, wherein the method further comprises receiving a signal representing an indication from the user as to which of the scenarios the user chooses.

16. The non-transitory program storage device of claim 15, wherein receiving a signal includes analyzing a signal representing a voice command from the user using a speech recognition engine.

17. The non-transitory program storage device of claim 12, wherein the method further comprises establishing a default choice governing the primary transaction should the user fail to select from among the first and second scenarios.

18. The non-transitory program storage device of claim 12, wherein establishing communication includes establishing communication with a directory assistance utility.

19. The non-transitory program storage device of claim 12, wherein offering the user a choice includes offering a choice between a no-fee scenario for conducting the primary transaction and a fee-based scenario for conducting the primary transaction.

20. The non-transitory program storage device of claim 12, wherein offering the user a choice includes offering the user a no-fee option for conducting the primary transaction in exchange for the user receiving the at least one offer of an upsell transaction.

21. The non-transitory program storage device of claim 12, wherein obtaining primary transaction data includes obtaining from the user a directory entry for which the user indicates information.

22. The non-transitory program storage device of claim 12 wherein the offer of the upsell transaction is based on the primary transaction by utilizing the data representing the user to obtain at least a second data element relating to the user.

23. The non-transitory program storage device of claim 12 wherein the offer of the upsell transaction is based on the primary transaction by utilizing at least in part the primary transaction data including an identity of the good or service of the primary transaction and the second data element to determine at least one upsell item to offer as an upsell transaction to the user.

24. An apparatus, comprising:
an upsell system configured to:
obtain primary transaction data relating to a primary transaction, the primary transaction data including data representing a user and representing at least one specific item;
offer the user a choice between at least two scenarios under which to conduct the primary transaction, wherein a first scenario provides that the user may conduct the primary transaction at a first cost to the user in exchange for the user receiving at least one offer of an upsell transaction, and wherein at least a second scenario provides that the user may conduct the primary transaction at a second cost to the user in exchange for receiving no offers of upsell transactions; and
conduct the at least one primary transaction, wherein the at least one primary transaction is within a definite number of permitted discrete primary transactions as defined by the user.

25. The apparatus of claim 24, wherein the upsell system is configured to generate an offer of the upsell transaction based on the primary transaction, wherein the offer of the upsell transaction is based on the primary transaction by utilizing the data representing the user to obtain at least a second data element relating to the user.

26. The apparatus of claim 24 wherein the offer of the upsell transaction is based on the primary transaction by utilizing at least in part the primary transaction data including an identity of the good or service of the primary transaction and the second data element to determine at least one upsell item to offer as an upsell transaction to the user.

* * * * *